United States Patent
Ogawa et al.

(10) Patent No.: US 7,047,551 B2
(45) Date of Patent: May 16, 2006

(54) INFORMATION DISTRIBUTING METHOD AND INFORMATION DISTRIBUTING SYSTEM

(75) Inventors: Katsuhisa Ogawa, Tokyo (JP); Koichi Kadokura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1088 days.

(21) Appl. No.: 09/840,103

(22) Filed: Apr. 24, 2001

(65) Prior Publication Data
US 2002/0016972 A1    Feb. 7, 2002

(30) Foreign Application Priority Data
Apr. 28, 2000    (JP)    ............... 2000-129991

(51) Int. Cl.
H04N 7/16    (2006.01)
(52) U.S. Cl. ............... 725/141; 725/153; 725/80
(58) Field of Classification Search ............... 725/133, 725/141, 153, 74, 78, 80, 82
See application file for complete search history.

(56) References Cited

U.S. PATENT DOCUMENTS

| 5,228,118 A * | 7/1993 | Sasaki ............... 358/1.13 |
| 5,580,177 A * | 12/1996 | Gase et al. ............... 400/61 |
| 5,758,257 A | 5/1998 | Herz et al. ............... 455/2 |
| 5,793,414 A * | 8/1998 | Shaffer ............... 725/133 |
| 5,835,087 A | 11/1998 | Herz et al. ............... 345/327 |
| 5,978,013 A | 11/1999 | Jones et al. ............... 348/10 |
| 6,002,394 A | 12/1999 | Schein et al. ............... 345/327 |
| 6,006,257 A | 12/1999 | Slezak ............... 709/219 |
| 6,543,052 B1 * | 4/2003 | Ogasawara ............... 725/60 |
| 6,930,788 B1 * | 8/2005 | Iwamoto et al. ............... 358/1.15 |

FOREIGN PATENT DOCUMENTS

| WO | WO 98/56188 | 12/1998 |
| WO | WO 99/39278 | 8/1999 |
| WO | WO 00/30353 | 5/2000 |
| WO | WO 00/40027 | 7/2000 |

OTHER PUBLICATIONS

U.S. Appl. No. 09/357,585.

* cited by examiner

*Primary Examiner*—Vivek Srivastava
(74) *Attorney, Agent, or Firm*—Fitzpatrick, Cella, Harper & Scinto

(57) ABSTRACT

In order to allow an advertisement company to register advertisement information using the Internet and conduct publicity activities aimed at specified target users, profile data of a plurality of users is managed using a database, selection conditions for selecting specific users to whom advertisement information should be distributed are received, specific users to whom the advertisement information should be distributed are selected based on the received selection conditions and the managed profile data, and the advertisement information is distributed to the selected specific users utilizing a digital broadcasting system.

14 Claims, 26 Drawing Sheets

FIG. 6A

```
┌─────────────────────────────────────────────────┐
│  BROWSER                                        │
├─────────────────────────────────────────────────┤
│                                                 │
│  To Contents Provider                           │
│    Abcd····                                     │
│                                                 │
│                                                 │
├──────────────────────┬──────────────────────────┤
│ Login                │ If you have not          │
│   ID No.:            │ registered,              │
│   ┌──────────────┐   │                          │
│   │ ABCD123456   │   │                          │
│   └──────────────┘   │                          │
│   Password           │ · please read before     │
│   ┌──────────────┐   │   registration.          │
│   │ ******       │   │ · please make            │
│   └──────────────┘   │   registration.          │
│      ┌───────┐       │                          │
│      │ Login │       │                          │
│      └───────┘       │                          │
├──────────────────────┴──────────────────────────┤
│                                                 │
│                                                 │
│                                                 │
│                                  ┌──────┬─────┐ │
│                                  │ HOME │BACK │ │
│                                  └──────┴─────┘ │
└─────────────────────────────────────────────────┘
  ↑
 204
```

FIG. 10

| BROWSER |
|---|

Please inform us of your desired contents.

Music
- ☐ Classical-Opera  ☐ Rock & Pops
- ☐ Dance & Soul  ☐ Jazz · Fusion
- ☐ -----------  ☐ -----------

Sports
- ☐ Baseball  ☐ Golf
- ☐ Tennis  ☐ Basket
- ☐ Football  ☐ Ice Hockey
- ☐ ------  ☐ -------

Play
- ☐ Play  ☐ Musical  ☐ Dance
- ☐ ----  ☐ ------  ☐ -----

Monthly Recommendation

| HOME | BACK |

| BROWSER |
|---|

AD to Request

- Term
  [          ]

- Keyword for Target Users
  - Area         [ Hokkaido ▼ ]
  - Age          [ 25-30 ▼ ]
  - Occupation   [ Service ▼ ]
  - Keyword      [          ▼ ]

[ Preview ]

Your Distribution Record
- AD 1 : J 400M  U 500M  E 120M
- AD 2 : J 400M  U 500M  E 120M
- AD 3 : J 400M  U 500M  E 120M
- AD 4 : J 400M  U 500M  E 120M
- AD 5 : J 400M  U 500M  E 120M Past Destinations Download of Statistical File

[ Download ]

[ HOME ] [ BACK ]

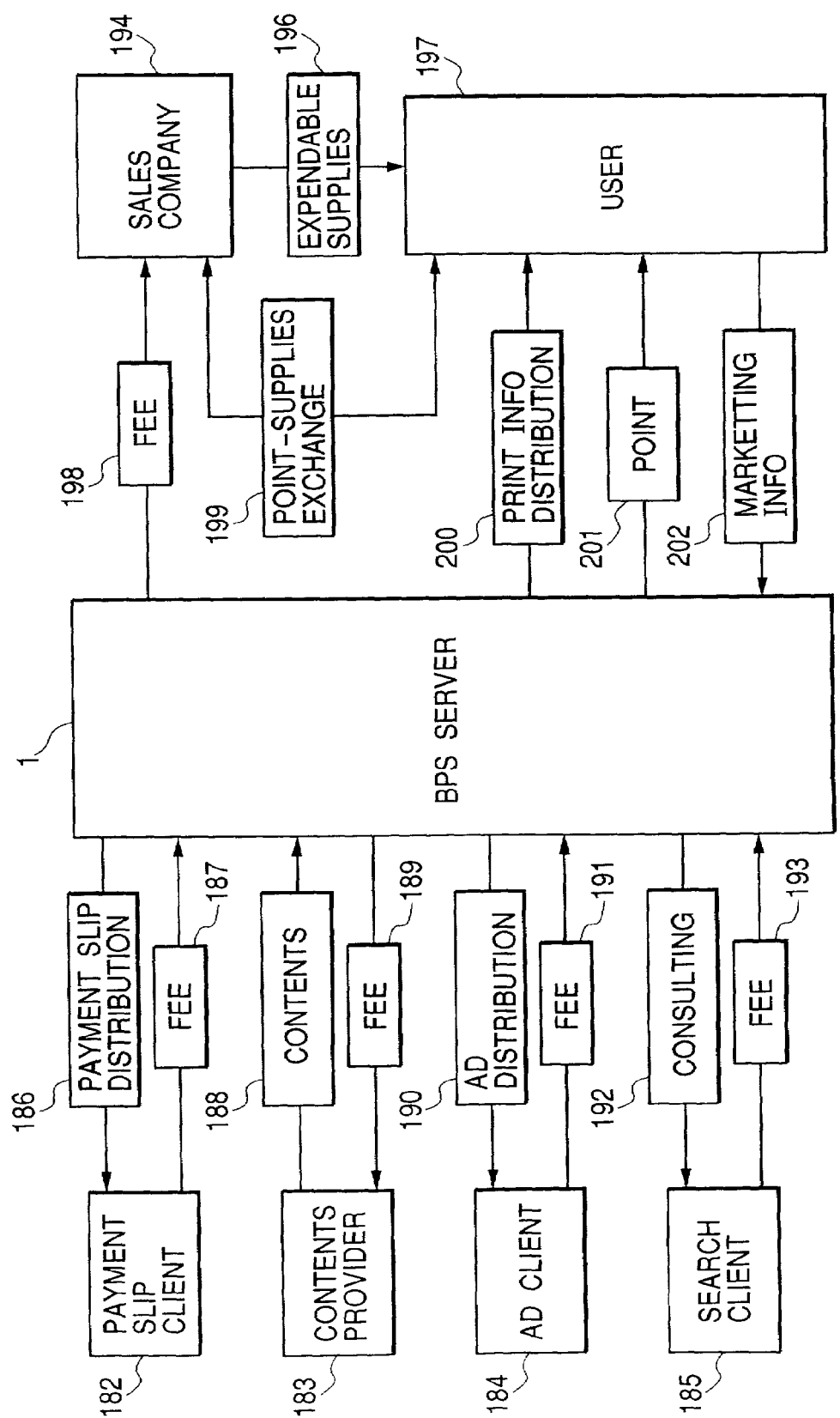

INFORMATION DISTRIBUTING METHOD AND INFORMATION DISTRIBUTING SYSTEM

BACKGROUND OF THE INVENTION

1. Field of the Invention

The present invention relates to an information distributing system and an information distributing method for distributing various information via the Internet. In addition, the present invention includes a technology relating to a system for realizing a printing service by causing a printing apparatus connected to a set top box (STB) of each home to print print information utilizing a two-way broad band communication network such as a cable television system.

2. Related Background Art

In recent years, as a personal computer has become inexpensive and personal computers have been introduced into many homes, a personal computer is widely used for enjoying the Internet at home by connecting the personal computer to telephone lines. However, for those who have not operated personal computers yet, operation of a personal computer is complicated and may not be accepted easily. It has been proposed that such people who do not have personal computers connect to the Internet using televisions for home use because operation of such televisions is easy. A representative example is the WebTV provided by Microsoft Corporation. The WebTV can be operated by a user as if the user operated a television using a remote controller. In addition, the WebTV has a configuration with which a user can connect to the Internet via telephone lines using the Windows CE and a browser installed in a set-top box (STB) of the WebTV.

In addition, in recent years, cable televisions are in wide use in Japan, and an increasing number of cable television companies offer Internet services using cable television lines that are two-way broad band communication networks. In a cable broadcasting system, a lot of television or radio programs, or contents such as those of shopping are sent as images, voices and character data and are received by each digital broadcast receiving apparatus through many channels. Character data is received together with a program itself (images and voices), which are included in a transmission signal. In addition, a line usage fee of an ordinary cable television is paid when a user makes connection to the Internet using this cable line. Thus, there is an advantage in that the user can connect to the Internet without paying a calling fee, and can access information of all over the world via the Internet using a television for home use free of charge or by only paying a charge as low as a general provider charge. In addition, since a broad band communication network is used, data transmission of a large capacity can be performed in a short time. Thus, Internet services using cable television lines are in wide use not only in Japan but also in other regions of the world.

In addition, a mechanism has been devised in which a printer is connected to an STB of a conventional WebTV and printing is performed by the printer in order to obtain print output of a screen displayed on the WebTV. In this case, a printer driver of a simple configuration is provided in an NVRAM of the STB to output data to an ink-jet printer as bitmap data of low resolution that is close to display resolution. Thus, even if the printer responds to high resolution, a result of printing is low in quality when an output of a bitmap image is performed.

That is, the conventional WebTV accesses the Internet, displays information desired by a user on the WebTV, generates a raster image of low resolution from the information using the printer driver in the STB to output the raster image to a low function printer. Thus, there is a problem in that a resulting print image has low resolution of the same level as display resolution of a TV display, and contents such as a photograph cannot be obtained in a form that satisfies the user.

In addition, a user accesses the Internet from a WebTV to display desired information, and then causes a printer to print the information by a printing instruction using a remote controller or the like. Therefore, the user needs to always retrieve required information by accessing the Internet, which is a significant burden for the user. Moreover, since a lot of users are likely to make an access during a period of time when a general user makes an access, there is a problem in that it takes long to retrieve or download information due to increased loads to a provider or a communication network. In addition, since a large load is applied to the printer driver in the STB during print processing, there is a problem in that a television screen freezes and the user cannot perform other operations.

In addition, since information that a user desires on the Internet is often included in a plurality of different home pages, the user needs to obtain necessary information by tracing each home page and print the information every time the user finds it. Thus, there is a problem in that the user has to bear significant burdens and it takes long time to obtain the information. Moreover, since the user prints necessary information every time the information is found even if little information is required, there also is a problem in that the number of printed sheets increases and costs of expendable supplies amount to a large sum.

In addition, an advertisement company that wishes to advertise something to many users cannot do anything but wait for users to access his home page or other home pages on which a banner advertisement is inserted. Thus, the advertisement company has to insert a banner advertisement linked to its own home page in many home pages to increase the number of users who access the home page on which the advertisement is inserted. Therefore, there is a problem in that the advertisement company cannot easily place an advertisement to users targeted for promotion. In addition, since the advertisement company only shows an advertisement to a user who visits the home page and cannot specify an age of a user or a region where the user lives to place an advertisement, efficiency is low. In addition, in order to realize a user-specified advertisement, the advertisement company can only advertise by direct mails conventionally. Thus, there is a problem in that costs such as costs of paper for direct mails, personell expenses, postage increase, or the like.

In addition, a provider of information such as a home page on the Internet can receive an advertisement fee from an advertisement company in return for insertion of a banner advertisement, and also can receive an contents fee in return for provision of contents (information). However, there is a problem in that, for an information provider whose home page users do not frequently visit, this does not pay as a business.

SUMMARY OF THE INVENTION

The present invention has been devised in view of the above problems, and it is a first object of the present invention to realize a print image of high resolution with a printer connected to an STB (set-top box) of a TV for home use.

It is a second object of the present invention to provide a mechanism with which a user collects desired information via the Internet and actively outputs the collected information as print information, thereby passively obtaining a desired print image. It is also an object of the present invention to provide a mechanism with which a user passively receives print data at a designated time via the Internet and prints the received print data.

It is a third object of the present invention to reduce burdens on a user and costs of expendable supplies by collectively laying out information desired by the user and existing in various locations on the Internet to generate distribution information and distributing the distribution information.

It is a fourth object of the present invention to provide a mechanism with which active distribution processing with high security can be realized by distributing distribution information from an information providing company using a private line of a cable television.

It is a fifth object of the present invention to provide a mechanism that allows an advertisement company to register advertisement information using the Internet and conduct publicity activities aimed at specified target users.

An information distributing method of the present invention for attaining the above-mentioned first object is provided with, for example, the following configuration. That is, an information distributing method using a cable line for digital broadcasting, which comprises: an identification step for identifying a type of a printing apparatus to be connected to a set-top box of each user; an obtaining step for obtaining data that should be printed for specific users; a selection step for selecting a printer driver corresponding to the printing apparatus based on the identification information; a generation step for generating, using the selected printer driver, print information that should be printed by the printing apparatus of the specific users from the obtained data that should be printed; and a distribution step for distributing the generated print information to a set-top box of the specific users via the cable line.

In addition, an information distributing method of the present invention for attaining the above-mentioned second object is provided with, for example, the following configuration. That is, an information distributing method of distributing print information to specific users based on information to be obtained via the Internet, which comprises: a management step for managing selection conditions for selecting distribution information which is obtained from the specific users in advance; a collection step for collecting distribution information that should be distributed to the specific users from the information obtained via the Internet based on the managed selection conditions; a generation step for generating print information that should be printed by the specific users based on the above-mentioned collected distribution information; and a distribution step for actively distributing the generated print information to the specific users.

In addition, an information distributing method of the present invention for attaining the above-mentioned third object is provided with, for example, the following configuration. That is, an information distributing method for distributing desired information to specific users, which comprises: a receiving step for receiving selection conditions for selecting desired contents information from specific users; a selection step for selecting contents information that should be distributed to the specific users based on the above-mentioned received selection conditions out of contents information collected from a plurality of sites via the Internet; a generation step for laying out the selected contents information collected from the plurality of sites as one file to generate distribution information; and a distribution step for distributing the generated distribution information to the specific users.

In addition, an information distributing method of the present invention for attaining the above-mentioned fourth object is provided with, for example, the following configuration. That is, an information distributing method of distributing print information via a cable network for a digital broadcasting system to a user who has a set-top box for transferring received print information to a connected printing apparatus, which comprises: a receiving step for receiving distribution information that should be distributed to a user designated by an information distribution server; a generation step for generating print information based on the received distribution information for each user; and a distribution step for distributing the print information generated for each user to the set-top box of the designated user utilizing the cable network.

In addition, an information distributing method of the present invention for attaining the above-mentioned fifth object is provided with, for example, the following configuration. That is, an information distributing method of distributing advertisement information to be generated at an advertisement company to a plurality of users to be selected, which comprises: a management step for managing profile data of a plurality of users using a database; a receiving step for receiving selection conditions for selecting specific users to whom advertisement information should be distributed; a selection step for selecting the specific users to whom advertisement information should be distributed based on the received selection conditions and the managed profile data; and a distribution step for distributing advertisement information to the selected specific users utilizing a digital broadcasting system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

In the accompanying drawings,

FIGS. 6A and 6B illustrate user interface that is displayed on a browser when contents of objects of distribution in a contents server are registered in the BPS server;

FIG. 10 illustrates a user interface to be displayed on a TV screen when registration of desired contents is processed in the STB;

FIGS. 14A and 14B illustrate user interface to be displayed on a browser when registration of advertisement distribution is processed in the advertisement company;

FIG. 24 is an image view for illustrating a charging mechanism in the system of the present invention.

DETAILED DESCRIPTION OF THE PREFERRED EMBODIMENTS

Preferred embodiments of the present invention will be hereinafter described in detail with reference to the accompanying drawings.

In the following embodiment, an information distribution system will be described in which a BPS (Broadband Printing Service) for performing main control of the present invention collects contents information on the Internet and transfers the information to a cable television head end of a cable television company, and the cable head end multicasts the information to each user (monocast is also possible) in a digital broadcasting system with which contents are transmitted via a two-way broad band communication network. According to this embodiment, the system is a system for allowing a user to obtain a print image of high resolution using a printer connected to an STB (set-top box) of a TV for home use.

Figure 1:
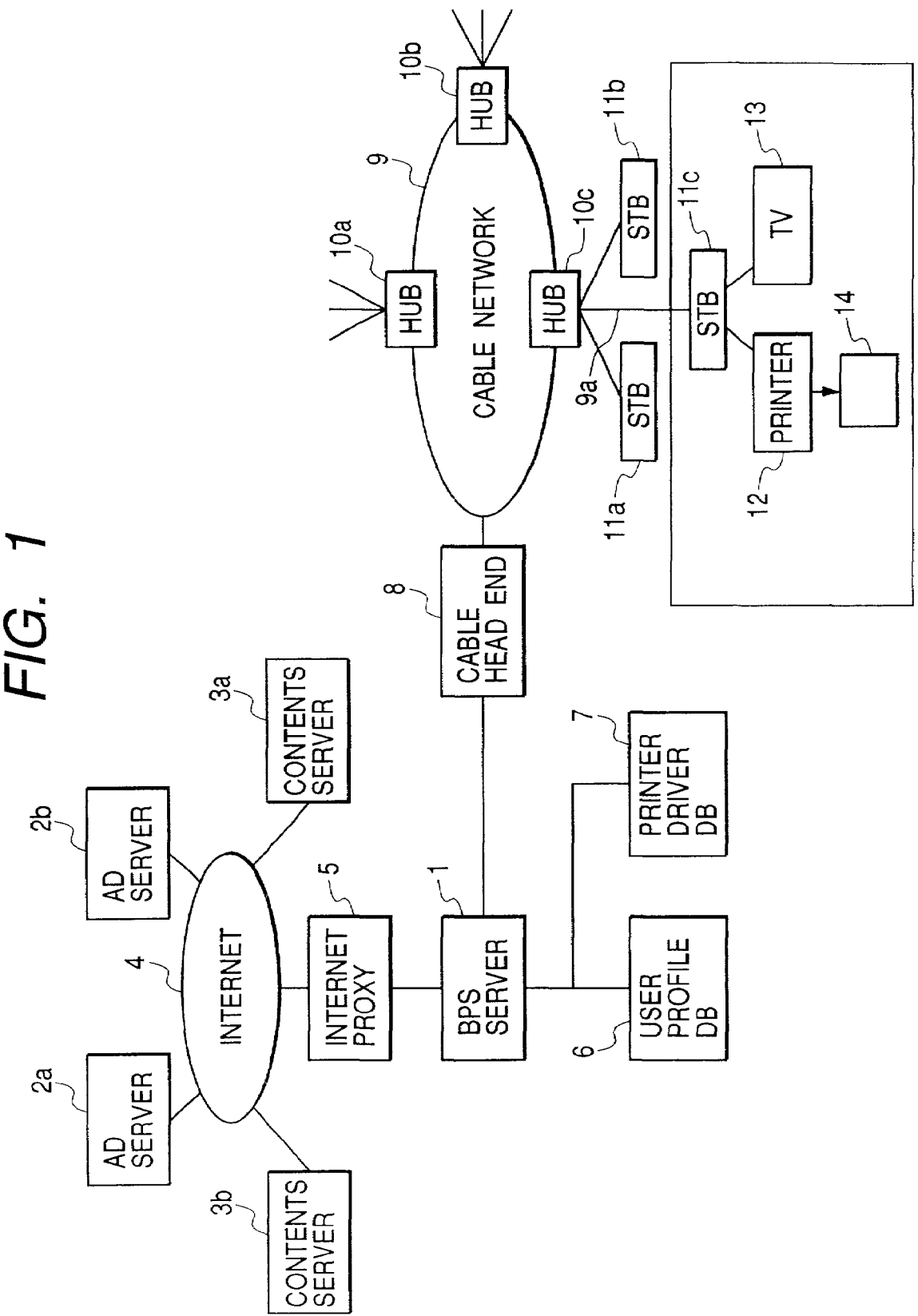
FIG. 1 is an infrastructure diagram of a printing system of the present invention using a digital broadcast.

An infrastructure configuration for realizing an embodiment of the present invention is shown in FIG. 1. Reference numeral 1 denotes a BPS server having a characteristic mechanism of the present invention. Print information required for distribution is sent to the BPS server 1 from a provider of information (a request for advertisement, a request for distribution of documents such as contents provider and a payment slip) on a company side being an information provider through the Internet 4 and via an Internet proxy server As the information provider, there are advertisement company servers 2a and 2b to which an advertisement request is sent, and contents servers 3a and 3b of a bank that holds payment slip and account entry information, a newspaper publishing company that holds event news and sports article information, a company that holds contents such as photographs and novels, and the like.

Here, as print information that the BPS server 1 obtains, there are advertisement information such as an advertisement and a coupon that the advertisement company wishes to send to each user from the advertisement company server 2a and 2b, and contents information such as image contents, a bank deposit statement, a payment slip, a sports article or the like that a user desires to collect from each of the contents servers 3a and 3b.

The BPS server 1 collects advertisement information obtained from each of the advertisement company servers 2a and 2b and content information obtained from each of the contents servers 3a and 3b over the Internet 4. In addition, set-top boxes 11a to 11c (hereinafter referred to as STB) of each user obtain identification information of a printer 12 that is connected to the STBs, and uploads the information to a cable head end 8 (a server of a cable television company; hereinafter referred to as CHE 8). The CHE 8 gives an ID of each client user and the identification information of the printer to the BPS server 1, and the BPS server 1 retains the obtained information in a user profile database 6 (hereinafter referred to as the user profile DB 6). User individual information and contents history information to be described later as well as a P-point (print point) are stored in the user profile DB 6, which are updated appropriately. In addition, the BPS server 1 retains a plurality of general printer drivers, which are supposed to be used by users of this system, in a printer driver database 7 (hereinafter referred to as printer driver DB 7).

The BPS server 1 generates print information of a print image suitable for a destination user from the collected advertisement information and contents information. This processing is realized by the BPS server 1 accessing the user profile DB 6 in which information peculiar to the user is stored to obtain identification information of a printer 12 owned by a user being a destination of the print information and selecting a corresponding printer driver out of the printer driver DB 7 in order to recognize the printer 12 of the destination user.

The BPS server 1 reads the selected printer driver from the printer driver DB 7, activates the printer driver and rasterizes advertisement information and contents information to be distributed to develop the information in a rasterized image that can directly drive the printer. The rasterized print information prepared for each user in this way is sent to the CHE 8 from the BPS server 1. The CHE 8 multiplexes the rasterized print information received form the BPS server 1 together with information of a BS/CS broadcast, a ground wave broadcast, a self-produced program broadcast or the like, and forwards the multiplexed information to a cable network 9. A hub 10 (HUB) is installed in the cable network 9, which distributes a broad band signal that is transmitted by the cable network 9 to users in a specific area. An STB 11 of a user is connected to the hub 10 via a cable line 9a, and the user receives the broad band signal transmitted from the CHE 8 via the STB 11.

The broad band signal received in the STB 11 via the cable line 9a is separated into TV information consisting of video and audio and the rasterized print information distributed from the BPS server 1 by a multiple signal separation technology. The TV information is sent to a TV monitor 13 and displayed on a display to be viewed. The rasterized print information is transferred to the printer 12 without being displayed on a display 13, and the print information is printed to be output to a recording medium 14 by the printer 12.

In addition, as described above, various statuses and identification information of the printer 12 at the times of printing and not printing can be sent to the CHE 8 via the STB 11 making use of the cable network 9 being a two-way communication network. In the CHE 8, the BPS server 1 can find the status of the printer 12 on a real time basis by demodulating the statuses and the identification information to send them to the BPS server 1.

In addition, although the CHE 8 and the BPS server 1 are described as different devices in FIG. 1, in the case in which the CHE 8 and the BPS server 1 preferably exist in the same place but actually exist in different places, the printer driver DB 7 may exist under the CHE 8. In this case, the BPS server 1 specifies a user and a printer driver to send contents information to the CHE 8, and the CHE 8 reads a suitable printer driver from the printer driver DB to generate print information and distributes the print information to a specific STB.

Figure 2:
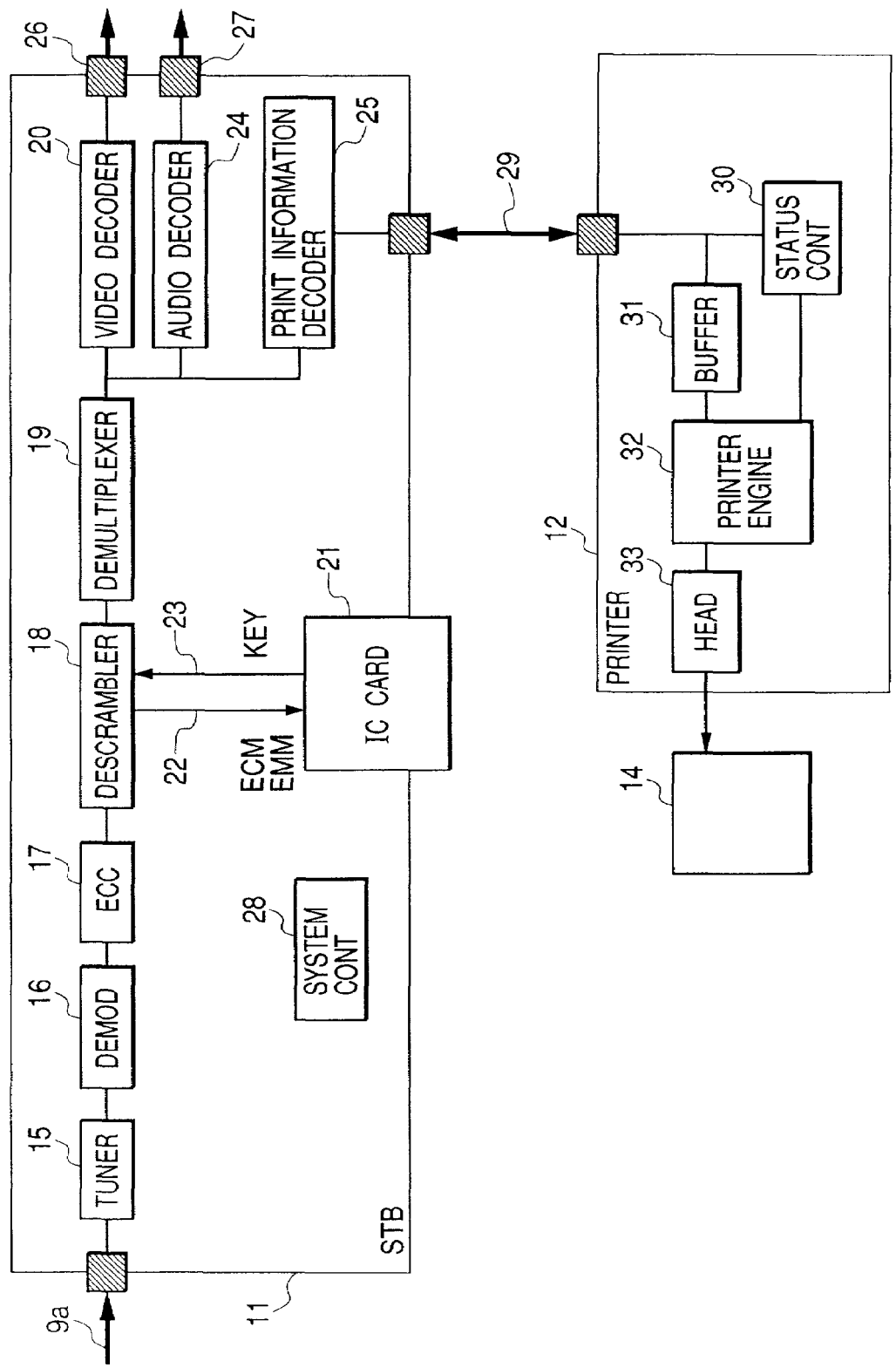
FIG. 2 is a block diagram showing an internal configuration of an STB and a printer.

FIG. 2 is a block diagram of the STB 11 and the printer 12 in the present invention. A broad band multiple signal forwarded from the CHE 8 is inputted in the STB 11 via the cable line 9a. In a demodulation block, the broadband multiple signal received in a tuner 15 as an RF signal removes a carrier from a signal that is digitally modulated. The CHE 8 adds a code for error correction to send the signal in order to correct an error in a transmission line as pre-processing for transmission. An error correction block 17 corrects an error occurred in the transmission line by using the error correction code added by the CHE 8. Information of a user, particularly information such as a subscribed channel is recorded in an IC card 21. Control information (ECM) and individual information (EMM) 22 that are detected in a de-scramble block are sent to the IC card 21. The IC card 21 compares the control information (ECM) and individual information (EMM) 22 with user information registered in the IC card 21 to confirm coincidence, and forwards a decryption key 23 to the de-scramble block 18. The channel subscribed for by the user is reproduced when the user decrypts the scramble for signal reproduction by the decryption key 23.

Then, the de-scrambled signal is inputted in a demultiplexer 19, and each piece of multiplexed information of video, audio and printing is separated. The separated video signal is decompressed by a video decoder to be an ordinary video signal 26 and outputted. In addition, the separated audio signal is decompressed by an audio decoder to be an ordinary audio signal 27 and outputted.

The print information of the present invention is restored as the rasterized print information transmitted by the BPS server 1 via a print information decoder 25, and sent to the printer 12 via a serial interface 26. The print information sent to the printer 12 is stored in a line buffer 31. The rasterized print information stored in the line buffer 31 is sent to a printer engine 32 one after another, and is printed on the recording medium 14 by a printer head 33. A status controller 30 watches the printer engine 32, and sends a status such as occurrence of an error, an end-of-print and a distribution request of print information to the STB 11. The STB 11 sends current status information of the printer 12 to the BPS server 1 via the cable network 9 and the CHE 8.

In this way, since print information printed and outputted by the printer 12 is developed in a rasterized image by a corresponding printer driver in the BPS server 1 or the CHE 8, the print output is as high in resolution as printing from a personal computer (an image is generated with a resolution of 1440×720 dpi in an ink-jet printer and resolution of 600×600 dpi in a laser beam printer). Thus, in the mechanism of this embodiment, a high resolution image is obtained to which an output by a conventional simple driver held in an STB cannot be comparable.

Figure 3:
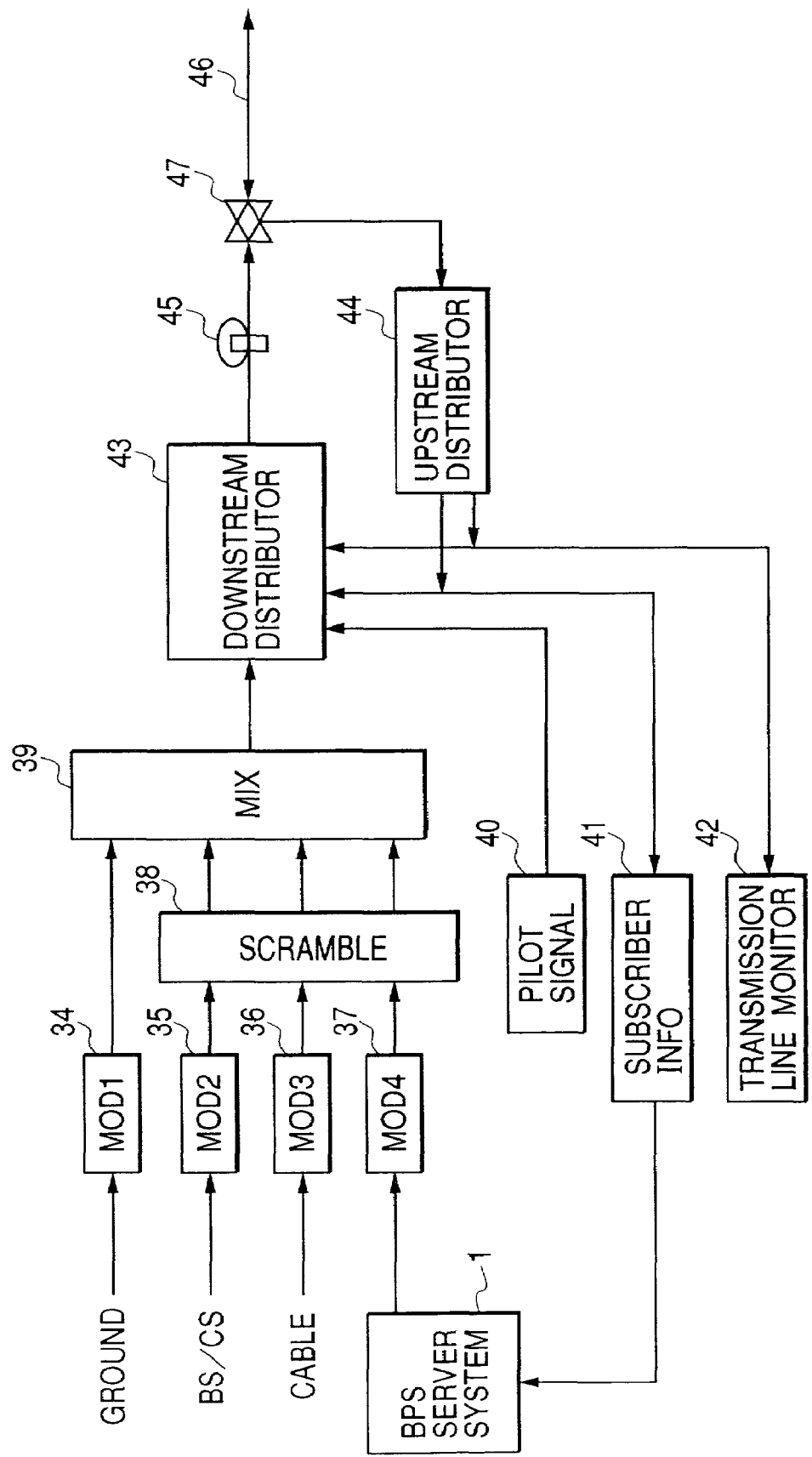
FIG. 3 is a block diagram showing an internal configuration of a CHE.

An internal configuration of the CHE 8 will now be described with reference to FIG. 3. FIG. 3 is an explanatory diagram of a digital modulation block for modulating broadcast information 34 to 36 and distribution print information 37 in line with a transmission format.

Reference numeral 34 denotes an MOD1 for inputting a ground wave broadcast, reference numeral 35 denotes an MOD2 for inputting a BS or a CS broadcast received by a parabolic antenna, reference numeral 36 denotes an MOD3 for inputting a self-produced broadcast produced by a cable TV station, and reference numeral 37 denotes an MOD4 for inputting print information sent from the BPS server 1 that is a characteristic of the present invention. Each of the digital modulation blocks MOD1 to MOD4, for example, modulates the information by 64 QAM, and sends outputs from the digital modulation blocks MOD2 to MOD4, which require further scramble processing, to a scramble processing block 38 to scramble them. Each signal processed in this way is inputted in a mix processing block 39 and multiplexed.

The multiplexed signal is inputted in a downstream distributor 43 and is added a modulation signal that is a multiplexed pilot signal for transmission line gain control generated by a pilot signal generation block 40. The multiplex modulation signal generated in this way is RF modulated by the downstream distributor 43, and is sent to an optical fiber cable 45. The optical fiber cable 45 is converted to an electric signal by a photoelectric conversion block 47, and is sent to users in a wide area via a coaxial cable 46 (cable network 9).

In addition, since two-way communication is possible with a cable line, user information (such as user individual information and printer identification information) sent from the STB 11 is received by an upstream distributor 44, and is sent to a subscriber information processing block 41. The user information in the subscriber information processing block 41 is sent to the downstream distributor 43, for example, as control information of a charge-type broadcast such as a pay-per-view. In addition, status information of a printer of a user which is one characteristic of the present invention is also received by the subscriber information processing block and is sent to the BPS server 1.

Figure 4:
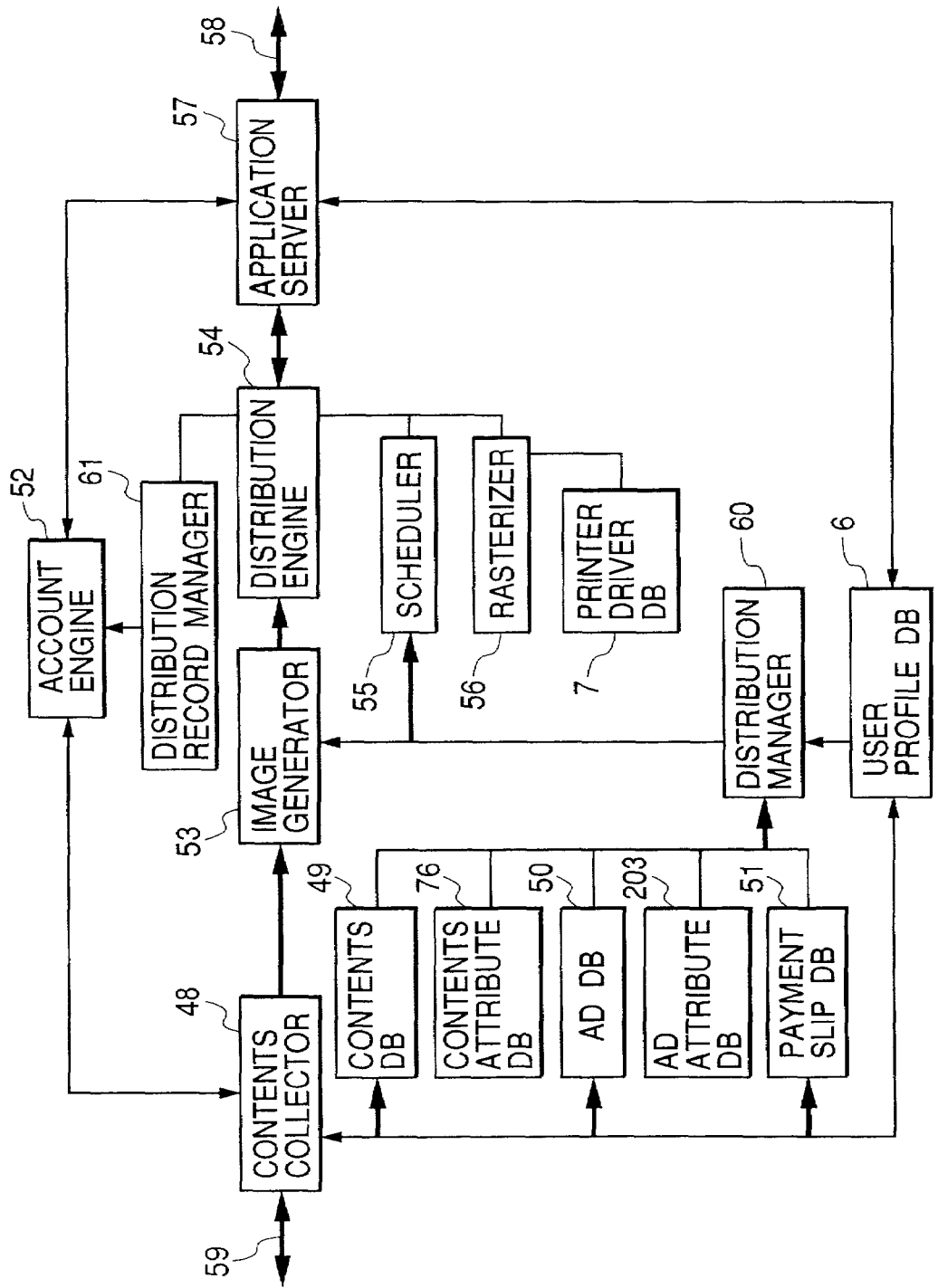
FIG. 4 is a block diagram showing an internal configuration of a BPS server.

An internal configuration of the BPS server 1 will now be described. FIG. 4 is a block diagram for illustrating an internal configuration module of the BPS server 1. Reference numeral 48 denotes a collector module for receiving print request information from the information provider (the advertisement company servers 2a and 2b, the contents servers 3a and 3b) on a company side being the print information provider illustrated in FIG. 1.

In the case of an advertisement distribution request from the advertisement company servers 2a and 2b, advertisement information received from the advertisement company servers is accumulated and registered in an advertisement database 50, and its attribute is accumulated and registered in an advertisement attribute database 203. Contents information provided by the contents servers 3a and 3b is accumulated and registered in a contents database 49, and its attribute is accumulated and registered in a contents attribute database 76. Concerning a distribution request for a document such as a payment slip and a bank deposit statement, text information in a payment slip database 51 and its attribute are registered. Attribute profiles of many users in a destination are stored in the form of a table in the above-mentioned user profile DB 6.

A distribution manager 60 analyzes the user profile DB 6, retrieves distribution information that should be distributed for respective users from the contents database 49, the advertisement database 50 and the payment slip database 51, and obtains the information. Distribution information (including contents information, advertisement information and payment slip information) that are determined to be distributed by the distribution manager 60 is transferred to a distribution image generator 53. A final distribution print information layout is determined as a print image by combining respective pieces of print information. The distribution print information completed in this way is sent to a print information distribution engine 54. A corresponding printer driver is read from the printer driver DB 7 after confirming a printer model of a destination user, and the distribution print information is then rasterized by a rasterizer 56 to be held as a rasterized image and waits for a distribution timing.

The distribution manager 60 obtains distribution time information that is designated by a user in advance from the user profile DB 6, and inform a scheduler 55 of a timing (time) of distribution. When the distribution time has come, the scheduler 55 notifies the print information distribution engine 54 and distributes print information to the STB 11 of the destination user from the print information distribution engine 54 via an application server 57.

The STB 11 receives the print information and, upon completion of printing by the printer 12, returns an end-of-print status to the application server 57 via the cable network 9 and the CHE 8. A history of print distribution is registered in a distribution record manager module 61 from the print information distribution engine 54 and is managed. This history information of print distribution indicates the number of users who received the print information and a print distribution information receipt status of each user, which can be accurately arranged as data. Based on the data, an account engine 52 performs charge and payment processing and processing for after-sales service for expendable supplies or the like according to the number of print distribution information receipt points of the user. Details of the charge processing and the distribution processing of expendable supplies according to the number of points will be described later.

Figure 5:
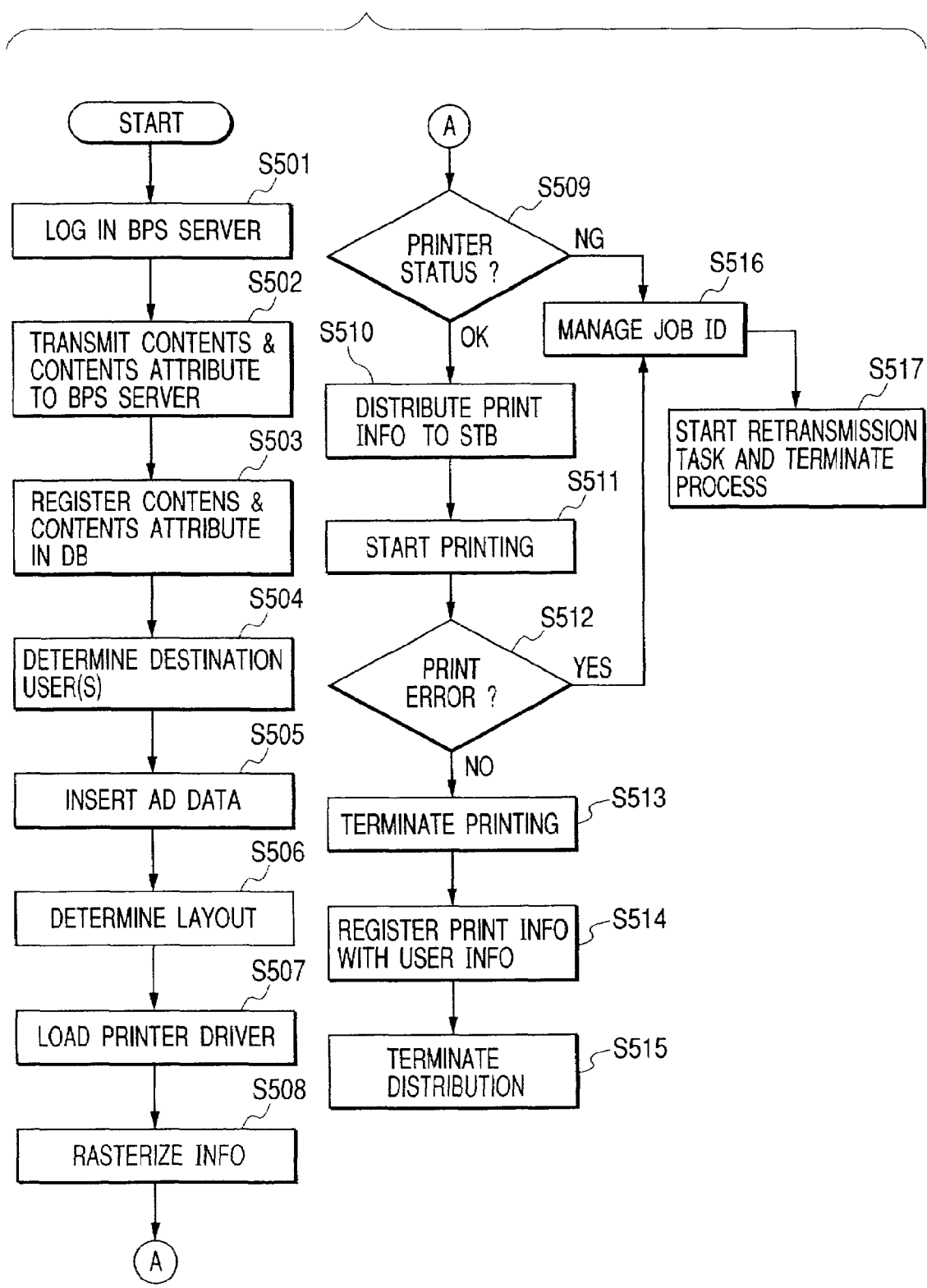
FIG. 5 is a flow chart showing a flow of entire processing in the present invention.

FIG. 5 is a flow chart showing a flow of entire processing of the present invention. FIG. 5 describes a summary of processing in the information providers 2 and 3, the BPS server 1 and the CHE 8.

First, in step S501, the information providers (the advertisement company server 2 and the contents server 3) access the BPS server 1 using a browser on each server and via the Internet. The information providers log in the BPS server 1 in step S501 and input registration ID numbers, passwords or the like. The BPS server approves the access based on this information. Then, in step S502, the information providers transfer contents to be distributed to users and contents attribute information to the BPS server 1 by "print contents & attribute information transfer". The contents attribute information is such as a genre to which the contents belong and a keyword representing the contents. The print contents sent via the Internet by "print contents & attribute information transfer" of step S502 are registered in the contents database 49 of the BPS server 1, and the print contents attribute information is registered in the contents attribute information database 203 (S503).

Subsequently, in step S504, determination processing of destination users according to attribute information is performed. The distribution manager 60 in the BPS server 1 reads out the registered contents attribute information from the content attribute information database 203 and analyzes it. The distribution manager 60 also accesses the user profile DB 6 and determines corresponding destination users. When destination users are determined, insertion processing of advertisement data is executed in step S505. The distribution manager 60 obtains advertisement attribute information from an advertisement attribute information database 204. The distribution manager then accesses the user profile DB 6 to determine an advertisement useful for the destination users who have been determined in the preceding step, and obtains the determined advertisement from the advertisement database 50. Thus, destination users of the contents to be distributed and an advertisement to be added for respective users are determined.

In step S506, layout determination processing of distribution information is executed. The distribution image generator 53 determines a layout drawing suitable for a layout of combined contents and advertisement for each destination user determined before from a plurality of layout drawings held in the not-shown layout DB. Then, the distribution image generator 53 determines a layout in which distribution information to be eventually sent to the destination users is arranged based on the layout drawing.

In step S507, the BPS server accesses the user profile DB 6, confirms printers of the destination users with reference to printer identification information, and reads a printer driver corresponding to the printers of the destination users from the printer driver DB 7. Then, in step S508, the BPS server converts a print image out of a plurality of pieces of distribution information (including advertisement information, contents information and payment slip information) to a raster image (bitmap information) matched to the destination printers by the rasterizer 56 using the printer driver read in the previous step such that the print image is arranged in the layout already determined. This processing is performed for each user. Preparation of print information for distribution ends in this way.

In step S509, the BPS server 1 obtains states of the printers of the destination users to whom the information is about to be distributed, and determines whether the printers can print. More specifically, a status request signal is sent to the printer 12 from the BPS server 1 via the STB 11. The printer 12 having received this signal notifies the STB 11 of the current state of the printer 12, and the STB 11 returns the printer state to the BPS server 1 via the CHE 8.

In step S509, if it is determined that the printer 12 of the destination user is in the state in which it cannot print (another print job being executed, running out of paper or running out of ink), or if a status is not returned, processing advances to step S516, the distribution record manager module 61 of the BPS server 1 registers the print information that was intended to be distributed and its job ID as unprocessed, and manages it. A printer status ID showing a status of the printer 12 in detail is added to information to be notified from the STB 11. In step S517, the BPS server 1 starts a retransmission task based on this printer status ID and the job ID, and terminates the process.

If it is determined that the printer 12 of the destination user is in the state in which it can print, in step S510, the BPS server 1 transfers the rasterized print information to the CHE 8, and distributes the print information to the STB 11 of the destination user via the cable network 9. Upon receiving print information from the BPS server 1, the STB 11 starts print processing by the printer 12 in step S511 and watches the status of the printer 12.

In step S512, the STB 11 watches the status of the printer 12, and determines if a print error has occurred or if printing has been completed. If it is determined that a print error has been generated, an error message is returned to the BPS server 1 and the STB 11 returns the processing back to the above-mentioned step S516. If it is determined that printing has been completed without an error, in step S513, the STB 11 generates a status of end-of-print in which all the pieces of distribution print information sent from the BPS server 1 are printed, and notifies the BPS server 1 of the state of end-of-print via the CHE 8.

In step S514, the BPS server 11 having received the status of end-of-print activates the distribution record manager module 61, holds the distribution print information and results of receiving information of a user who has completed printing, and manages the information. Thus, distribution results of requested distribution of an advertisement can be correctly grasped.

When the registration in this distribution record manager module ends, the distribution processing is terminated in step S515.

In this way, the collection processing and the distribution processing of information are performed in this system.

Figure 6B:
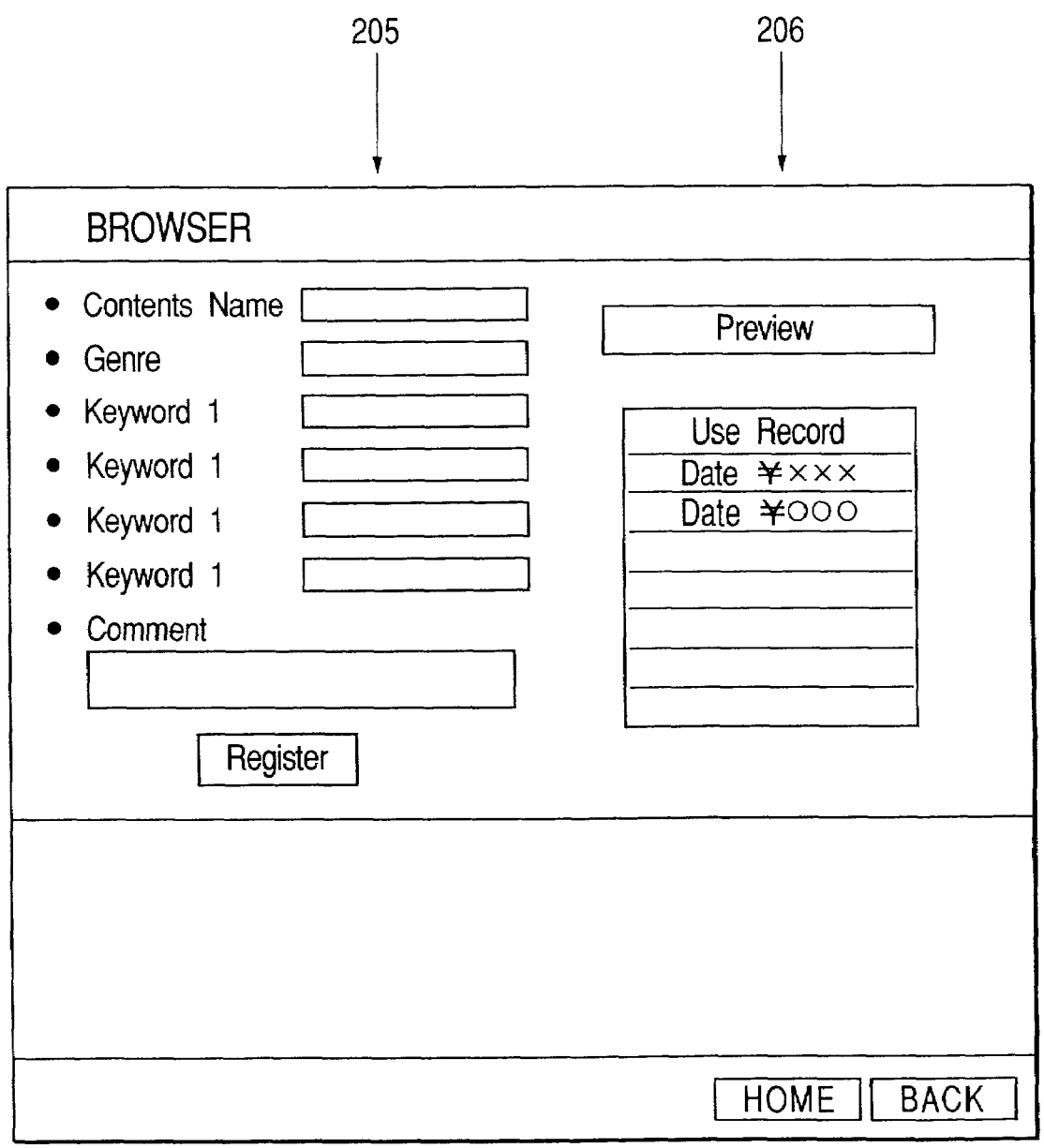

FIGS. 6A and 6B illustrate a user interface to be displayed on a browser when registration of distribution contents are processed in a contents provider.

FIG. 6A shows a display image of a Web browser when the information providers (the advertisement company server 2 and the contents server 3) make a connection to the BPS server 1 via the Internet.

The contents provider who made an access inputs a registration ID number and a password via an input form of a registration ID number and a password shown in the area 204 in FIG. 6A to log in the BPS server 1. In addition, if the contents provider has not been registered, it performs registration processing for registration in the area shown on the right side of the area 204. The registration processing includes procedures for registering a company name, a contact, designation of an account and the like. Since it is generally performed on the Internet, description of the processing is omitted herein.

When the registration procedures have been completed and the contents provider logs in the BPS server 1, the contents provider starts registration processing of contents that it desires distribution shown in FIG. 6B. Contents registered by the information providers (including image contents, article/news contents, use records, payment slips, advertisements or the like) are simply displayed as a contents preview image 206 in the figure to be confirmed. In addition, attribute information of the contents to be registered such as a contents name, a genre of contents, a keyword of contents and a massage that the contents provider wishes to add to the contents is inputted in a form 205. In this way, the attribute information is inputted in the contents collector module 48 of the BPS server 1. The contents collector module 48 registers the collected contents information and the attribute information in the contents database 49 and the contents attribute information database 76, respectively.

The genre of contents includes image contents and article/news contents as charged contents and use record contents and payment slip contents as free contents, and further includes advertisement contents as contents that are inserted free of charge and for which expendable supplies are free. In addition, the keyword can be registered freely and, for example, in the case of advertisement contents, a keyword can be inputted in advance as a condition such as "restaurant", "Kanagawa-ken", "Italian", "fully provided with a parking lot" or the like. The condition registered as a keyword here are inserted as an advertisement if it matches a keyword to be inputted as a condition of desired contents by a user as described later.

If a genre is registered as advertisement contents, the content collector module 48 registers the advertisement contents and the contents attribute information in the advertisement database 50 and the advertisement database 203, respectively.

Figure 7:
FIG. 7 is an image view showing contents laid out in the BPS server.

FIG. 7 illustrates an image showing contents laid out by the distribution image generator module 53 of the BPS server 1. A plurality of contents registered by the information providers are laid out in an area 207. As shown in the figure, there are a part for charged contents for articles/news and a part for free contents such as weather information and a use record, which are properly laid out.

In an area 208, advertisements useful for respective destination users are laid out, which are selected by the distribution manager 60 out of the contents attribute information and the user profile information. The advertisements include a part for advertisements and a part for coupons as shown in the figure.

Figure 8:
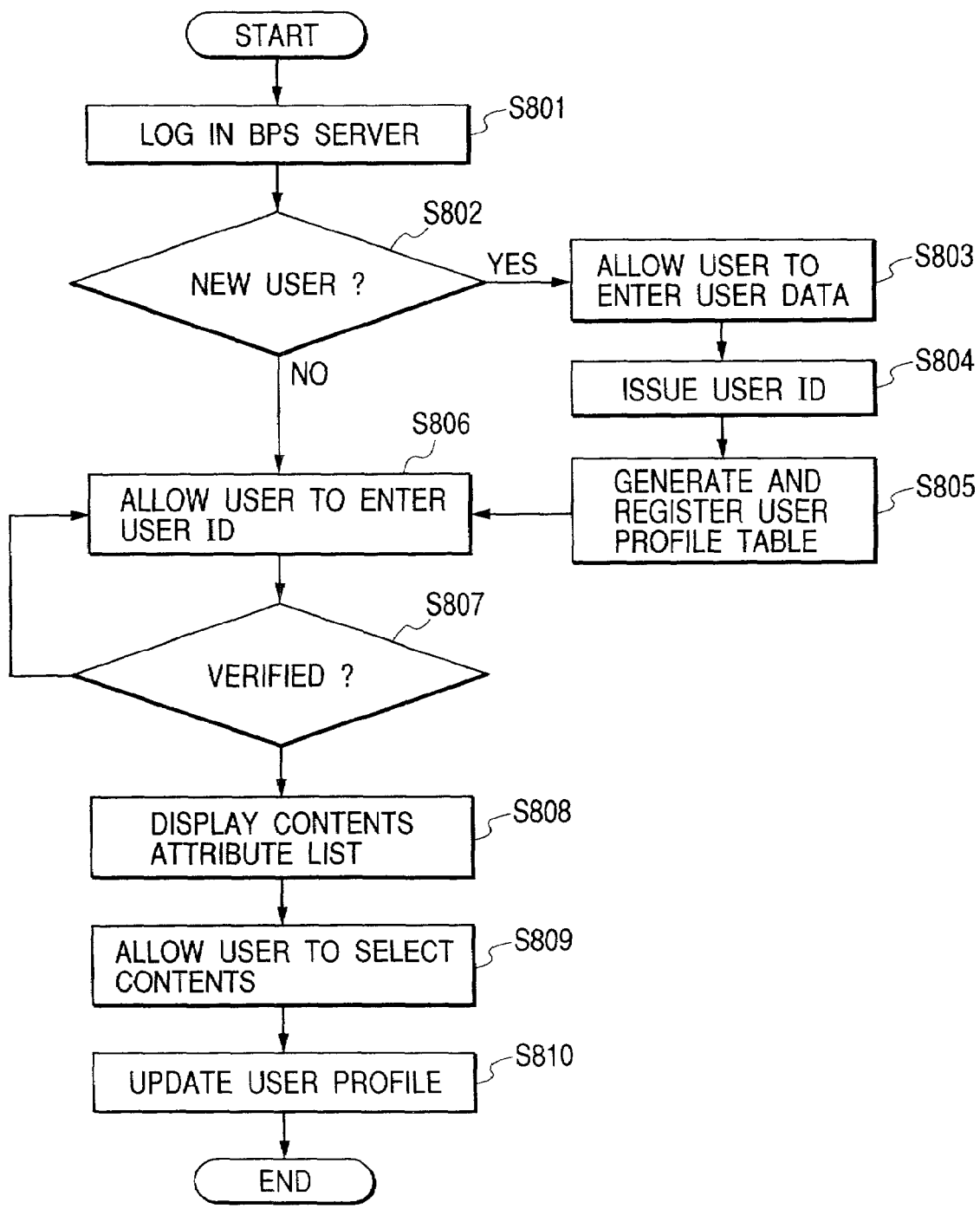
FIG. 8 is a flow chart showing first control processing in the BPS server.

FIG. 8 is a flow chart showing registration processing for desired contents in an STB of each user and registration processing of a customer profile in a BPS server.

In step S801, the STB 11 logs in the BPS server 1 according to an instruction from a user who receives distribution utilizing a user interface to be displayed on a monitor 13 connected to the STB 11. Since this can be performed in the same manner as a user generally makes a connection to the Internet via the cable line 9a, detailed description is omitted.

In step S802, the STB 11 indicates whether the logged-in user is a new user or a registered user such that the BPS server 1 can determine the same. This can be done by causing a new user to indicate that the user is a new user or causing a registered user to input a user ID.

In the case of a new user, the STB 11 requests a user interface from the BPS server 1 in which the user inputs basic data of the user such as a name, an age, a date of birth, and downloads HTML format data prepared in the BPS server 1 via the CHE 8 and the cable network 9 and displays the data on the monitor 13 to solicit the user to input the basic data. When the user basic data is inputted in the displayed user interface, the STB 11 sends the user basic information to the BPS server 1.

The BPS server 1 confirms that there is no fault in the user basic data received from the user, approves the user as a new user, and issues a user ID. In step S804, the STB 11 receives the issued user ID, and stores it in the IC card 21 or a not-shown NVRAM in the STB 11. In addition, the STB 11 simultaneously causes the monitor 13 to display a user interface including the user ID and allows the user to recognize it.

When the user ID is issued, in the next step S805, the STB 11 notifies the BPS server 1 that the user ID is confirmed by the user. Thus, a user profile table is prepared in the BPS server 1 and is registered in the user profile DB 6. In this way, the user is registered and logs in the BPS server 1 again.

In step S806, input processing of the user ID is performed. The STB 11 displays a user interface on the monitor 13 being a display, and solicits the user to input the user ID and the password. When the user ID and the password are inputted, the STB 11 sends its authentication information to the BPS server 1 via the cable line 9a and the CHE 8, and authentication is performed in the BPS server 1. When the user ID and the password are verified in the BPS server 1, processing advances to step S808.

In order to allow the user who is allowed to log in the BPS server to select desired contents out of distributable contents, in step S808, a user interface including condition input items for preparing a user profile is generated in the BPS server 1 and is downloaded in the STB 11. This is realized by the BPS server 1 reading out a contents attribute list in which contents registered in the contents database 49 are classified by genre and generating a HTML format file by a CGI program. The STB 11 displays the downloaded user interface on the monitor 13 and allows the user to input conditions or the like of the desired contents. A user interface including condition input items to be displayed on the monitor is shown in FIG. 10.

FIG. 10 is an example of a user interface to be displayed on the TV screen (monitor) 13 when registration of the desired contents is processed in the STB 11. As shown in FIG. 10, this user interface is for classifying in detail the contents registered in the contents database 49 of the BPS server 1 by genre and causing the user to select contents.

This image is displayed on a monitor connected to the STB 11 and, in step S809, an instruction to check, for example, "Classical-Opera" in "Music" is inputted in the STB 11 by the user's operation of a remote controller or the like. After the user checks the desired contents, in step S810, an instruction on information to be inputted is sent from the STB 11 to the BPS server 1. The BPS server 1 updates a corresponding user profile of the user already registered in the user profile DB 6 by the user information (a genre or a keyword of the contents desired by the user) received from the STB 11, and terminates the processing.

In this way, registration processing of desired contents is performed by a user using a UI in an STB and a BPS server being allowed to perform update processing of a user profile. In addition, the user can designate article/news contents, a use record, a payment slip or the like that the user desires as well as what kind of an advertisement the user desires as advertisement contents for making expendable supplies to be free of charge. Therefore, there is an effect that the user receives less unnecessary direct mails and an advertisement company can distribute advertisement contents to users who desire them, and distribution costs can be extremely lowered, thus all users (customers, advertisement companies and contents providers) utilizing this mechanism can be satisfied.

Figure 9:
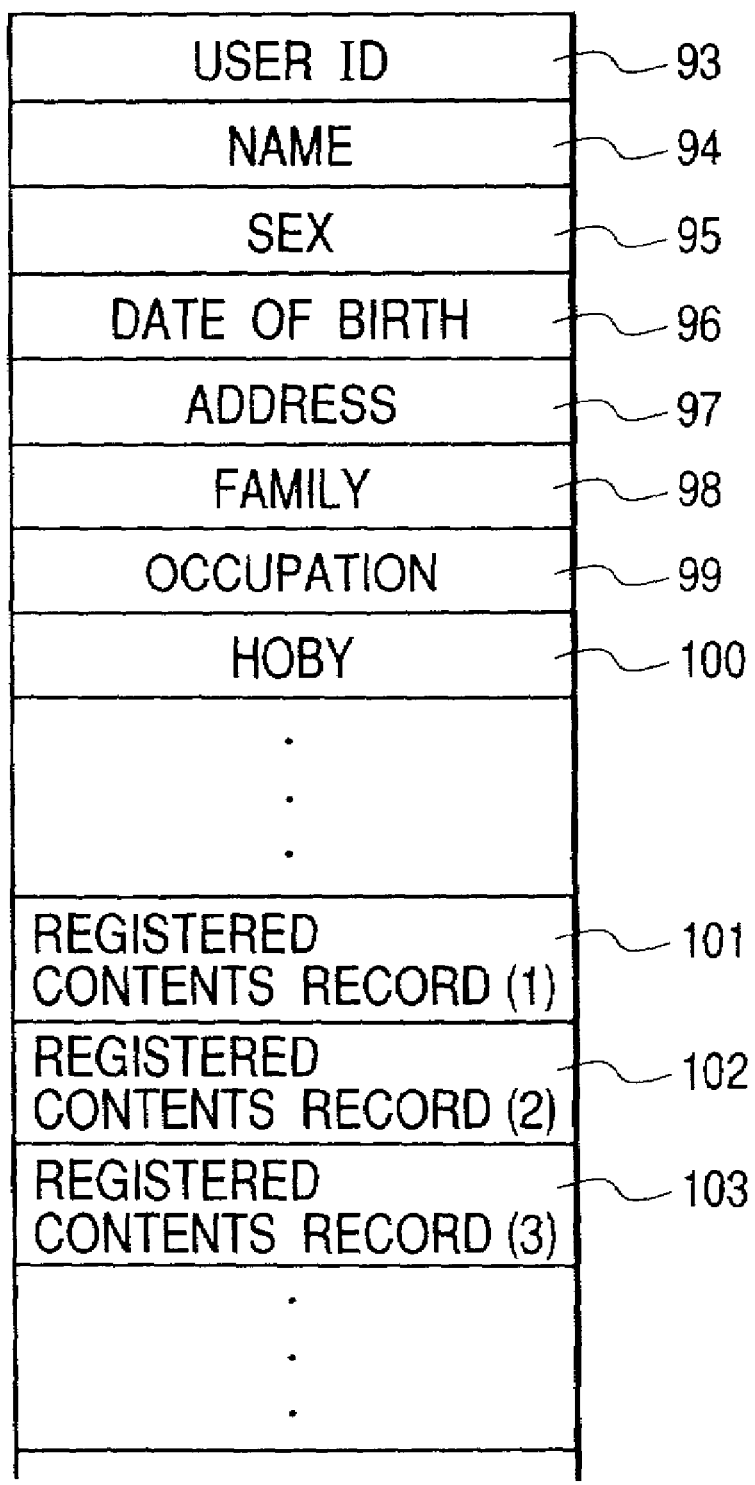
FIG. 9 is a data diagram showing contents of a customer profile to be registered in a customer database of the BPS.

FIG. 9 is a data diagram showing contents of a user profile registered in the user profile DB 6 of the BPS server 1. Reference numerals 93 to 100 denote items of a table for storing basic data of a user, which is registered in a user profile DB when a new user is registered.

Reference numeral 93 denotes a user ID number, which is issued to the STB 11 by the BPS server 1 and takes a unique value for each user when the user is initially registered. Reference numerals 94, 95, 96, 97, 98, 99 and 100 denote a name, a sex, a date of birth, a current address, family members, an occupation, a hobby, respectively, which are basic data of a user to be registered.

In addition, 101 and the following reference numerals denote user basic data other than the above-mentioned information. As information of user's desired contents explained in FIGS. 8 and 10, a genre keyword of the selected contents is registered in a registered contents histories (1) to (3) denoted by reference numerals 101 to 103. If there are many contents desired by a user or contents are added, this data registration section is extended. A genre keyword to be registered as a registered contents history include information for designating charged contents of article/news contents (a name of a newspaper such as ABC news), information for designating free contents of a use record (a name of a bank and an account number such as XXX Bank/XXX account), and conditions information for selecting contents of free expendable supplies of advertisement content (e.g., information to be selected in FIG. 10 such as music and sports).

In addition, information of a print time designated by a user is also stored in the contents history. When selecting desired contents in step S809 of FIG. 8, the user can designate a time when active print processing (push print) from the CHE 8 is performed using a user interface. The time information designated by the user in the UI is registered in the CHE 8 or a user profile in the BPS server 1 from the STB 11, and a schedule is managed by the scheduler 55 at the time of the push print. In addition, this desired time of print information can be registered for each content. For example, the desired time of print information can be registered designating the time for outputting article/news contents at 6 a.m. everyday and the time for outputting a use record at 6 a.m. on XX every month.

In addition, a P-point value is also registered following the contents history. The P-point value is a point for making expendable supplies to be free of charge when advertisement information is printed. A P-point is added every time advertisement information is printed and, when distribution processing of expendable supplies is performed, a P-point for the expendable supplies is consumed (deducted) and the P-point value is updated. Update processing of the P-point value is described in FIG. 17 later.

In this way, it becomes possible to automatically select information to be distributed to each user properly by registering or updating user basic data in the user profile DB 6 of the BPS server 1. In addition, it also becomes possible for a user to designate a time when print information is distributed and print processing is performed. For example, a service for outputting a weather forecast of the day and sports articles of the previous day to a printer every morning can be offered.

Figure 11:
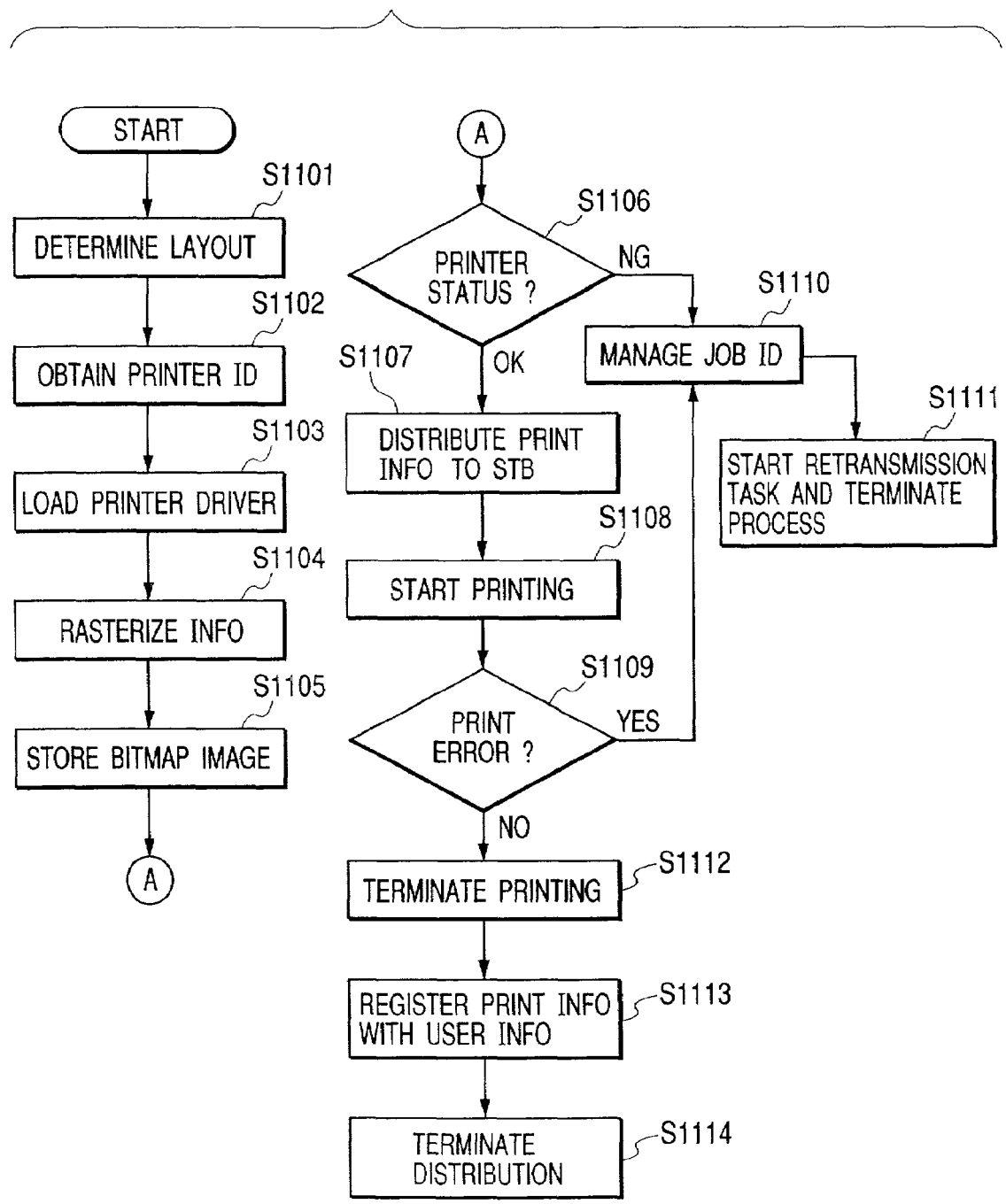
FIG. 11 is a flow chart showing control processing in the CHE.

Processing for converting distribution information received from the BPS server 1 to print information in the CHE 8 will now be described. FIG. 11 is a flow chart showing processing for generating a raster image by a printer driver based on the distribution information from the BPS server 1 in the CHE 8 and outputting the raster image to the STB 11 of each user.

In step S1101, destination users are determined by the distribution manager 60 of the BPS server 1 and a layout of distribution information to be sent to respective users is determined by the distribution image generator module 53. The obtained user designation information and the distribution information are inputted by the CHE 8 from the BPS server 1. The distribution information that the CHE 8 receives from the BPS server 1 is generated by the distribution image generator module 53, and is prepared in the format of either an HTML format file or a PDF file.

When recognizing the destination users designated by the BPS server 1, the CHE 8 acquires an ID of the destination printer 12 for the STB 11 of a destination user. Since the set-top box (STB) used with a cable television receiver is always turned on even while the power supply of the TV is off, it can always respond to a request from the CHE 8.

In step S1103, the CHE 8 reads a printer driver corresponding to the acquired printer ID from the printer driver DB 7. Further, as describe above, the printer driver DB 7 may be disposed below the CHE 8, and this is the processing for the case.

In step S1104, the distribution information in the HTML format or the PDF format that the CHE 8 received form the BPS server is rasterized by the printer driver which reads the distribution information, and print information in a data format printable by a printer to be connected to the STB 11 is generated. In this embodiment, the printer to be connected to the STB 11 is an ink jet printer, and the print information to be generated is a raster image. In addition, a laser beam printer may be connected to the STB 11 on rare occasions, in which case the print information is PDL data corresponding to the printer.

Then, in step S1105, a raster image being the generated print information is temporarily saved.

In step S1106, the CHE 8 obtains states of printers of the destination users, to which the print information is to be distributed, from the STB 11 via the cable network 9, and determines whether the print information can be printed. More specifically, a status request signal is sent from the CHE 8 to the printer 12 via the STB 11. The printer 12 having received this signal notifies the STB 11 of a current state of the printer 12, and the STB 11 returns the state to the CHE 8 via the cable network 9.

In step S1106, if it is determined that the printer 12 of the destination user is in the unprintable state (another print job being executed, running out of paper or running out of ink), or if a status is not returned, the processing advances to step S1110, and the CHE 8 registers print information that was intended to be distributed and its job ID as unprocessed, and manages it. A printer status ID indicating the status of the printer 12 in detail is added to information to be notified by the STB 11. In step S1111, the CHE 8 starts a task of re-transmission for this print distribution based on this printer status ID and a job ID, and terminates the processing.

If it is determined that the printer 12 of the destination user is in a printable state in step S1106, the CHE 8 distributes the rasterized print information to the STB 11 of the destination user via the cable network 9 in step S1107. When receiving the print information from the CHE 8, the STB 11 starts print processing by the printer 12 and watches the status of the printer 12 in step S1108.

In step S1109, the STB 11 watches the status of the printer 12 and notifies the CHE 8 of its result. The CHE 8 determines if a print error has occurred and if the print has been completed. If the CHE 8 determines that a print error has occurred, the processing is returned to the above-mentioned step S1110. If the CHE 8 determines that the print has been completed without any error, the STB 11 generates a status of end-of-print meaning that the entire print information sent from the CHE 8 has been printed, and notifies the CHE 8 of the status of end-of-print via the cable network 9 in step S1112.

In step S1113, the CHE 8 having received the status of end-of-print holds the results of receipts of print information and user information, which has completed printing, as data, and manages the data. Thus, distribution results of requested advertisements can be grasped accurately. In addition, the CHE 8 may send this information to the BPS server 1 and manage it in the BPS server, as described above with reference to FIG. 5.

When this registration processing is completed, the distribution processing is terminated in step S1114.

In this way, rasterizing processing of distribution information received from the BPS server 1 and active distribution processing of rasterized print information to each user are performed. Therefore, there is an effect that the CHE 8 can obtain a print output that is higher in resolution compared with the case in which print information prepared by a driver in an STB is printed in a conventional manner. In addition, there is also an effect that a user can save time and efforts for retrieving and collecting desired contents on the Internet.

Figure 12:
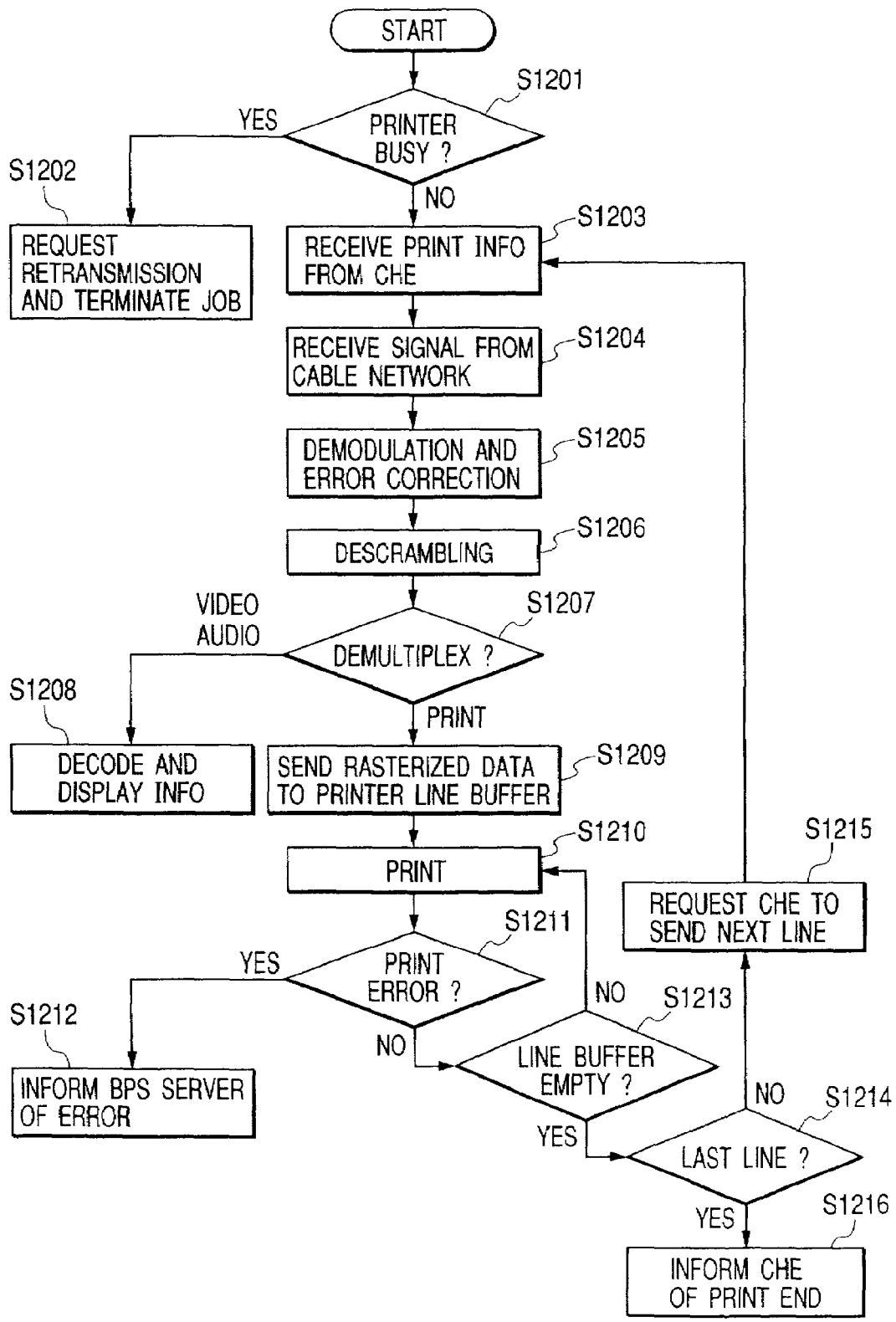
FIG. 12 is a flow chart showing control processing in the STB.

FIG. 12 is a flow chart showing processing for analyzing data to be received from the CHE 8 in STB 11, dividing the data into print information and broadcast information, displaying the broadcast information on the TV screen 13, outputting raster data being the print information to the printer 12 without displaying the data on the TV screen 13, and outputting information of a connected printer to the CHE 8 in the case of a status request.

The processing is started by the CHE 8 requesting status confirmation of the printer 12 of the destination user via the STB 11, or distributing information to the STB 11.

In step S1201, the STB 11 obtains a status of the printer 12 to be connected, and determines if the printer 12 is under processing. Here, if the printer 12 returns a status indicating that printing is unavailable due to some factors (another print being executed, running out of ink, running out of paper or the like), in step S1202, the STB 11 sends a retransmission request of a job and a current status of the printer 12 to the BPS server 1 (or the CHE 8) in order to request to start a task of retransmission later, and terminates the job.

In addition, if the STB 11 determines that the printer 12 is printable, it starts receipt processing of print information to be distributed from the CHE 8 in step S1203. The STB 11 first converts a first line of the print information, which has been converted to a raster image before, to a signal transmittable to a cable by a digital modulation block of the CHE 8, and receives the print information to be multiplexed with other signals and forwarded to the cable network 9. In step S1204, the signal conveyed by the cable network 9 is received by the STB 11. In step S1205, the received signal is demodulated by the STB 11, and a code error that has occurred in a transmission step is corrected by error correction processing.

In step S1206, the de-scramble module 18 of the STB 11 de-scrambles the distribution information by the processing described in FIG. 2, and accurately receives data. Subsequently in step S1207, the demultiplexer 19 of the STB 11 separates broadcast information of video and audio and print information that are multiplexed in the distribution information. Among the information, video and audio signals are outputted to the TV screen 13 by the video decoder 20 and the audio decoder 24 of the STB 11, and displayed and vocally outputted in step S1208. In addition, print distribution information extracted by the multiple signal separation is transferred from the print information decoder 25 of the STB 11 to the printer 12 in step S1209.

One line of the print information transferred to the printer 12 is stored in step S1209, and print processing is executed in the following step S1210. During the print processing, the STB 11 watches the status of the printer 12, and determines if an error has occurred during printing in step S1211. If the STB 11 determines that an error has occurred during printing, the STB 11 returns the BPS server 1 Error message in step S1212, and leaves determination to the BPS server 1.

On the other hand, in a state in which a print error has not occurred, the STB 11 watches if all the data of a line buffer has been printed in step S1213. If the print information remains in the line buffer, the STB 11 waits for prints to be executed by the printer 12. When the entire print information of the line buffer is outputted, the STB 11 determines if information printed by the printer 12 is information of the last line in step S1214. If the information is not information of the last line, the STB 11 requests the CHE 8 to send print information of the next line in step S1215. In addition, if the printed information is information of the last line, the STB 11 informs the CHE 8 of end-of-print in step S1216.

The STB analyzes distribution information received form the CHE, outputs broadcast information to a TV and outputs raster data to the printer 12, and prints it without displaying it on the TV. Thus, burdens of a user for having information that the user wishes to print displayed on the TV screen and instructing printing thereafter are eliminated, operations of the user are simplified, and it becomes possible to display other programs and perform the Internet operations even during printing.

Figure 13:
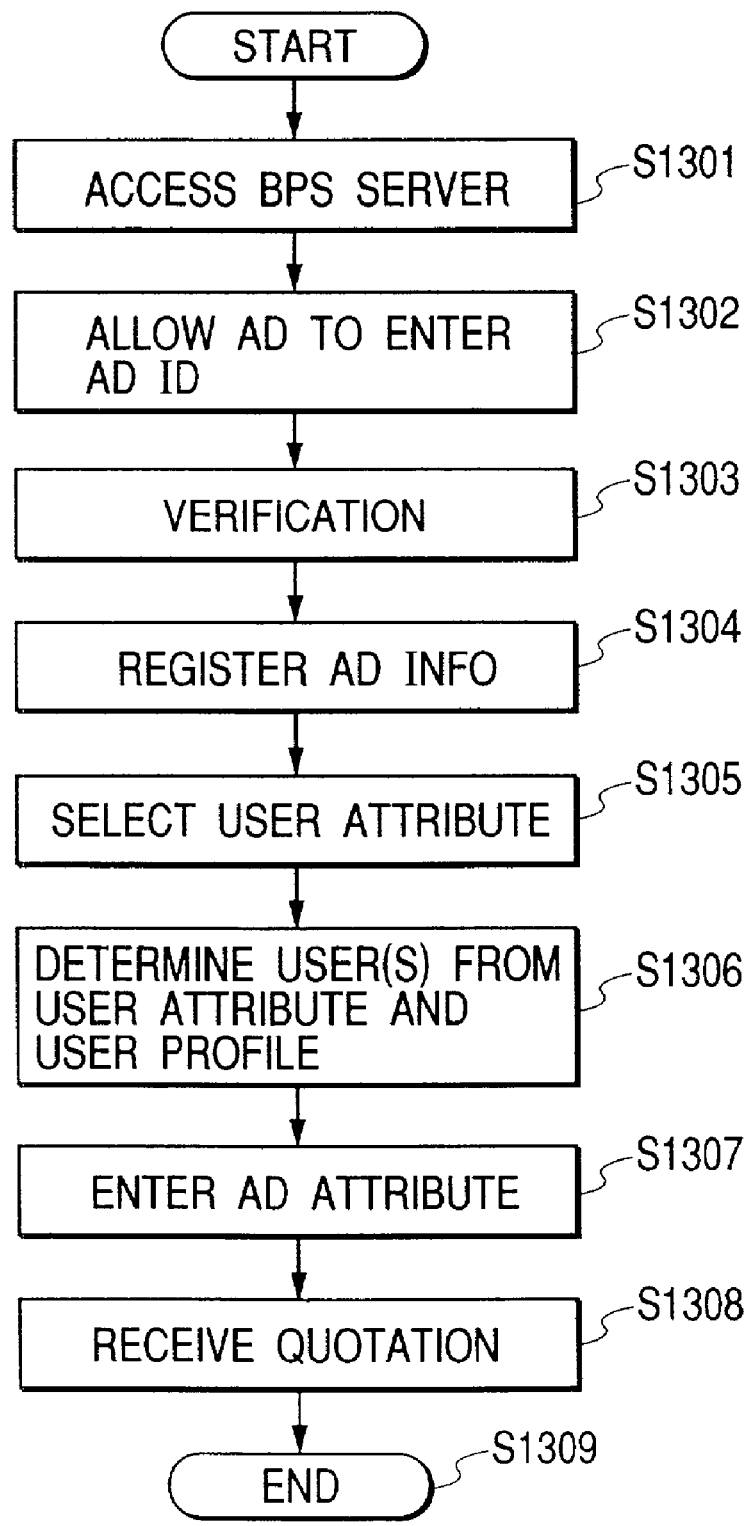
FIG. 13 is a flow chart showing registration processing of advertisement distribution in an advertisement company (AD)

FIG. 13 is a flow chart showing registration processing of advertisement distribution in the advertisement company (AD) servers (2a and 2b). This processing is started by an advertisement company that requested the advertisement distribution by accessing the BPS server 1 via the Internet 4.

First, in step s1301, an advertisement company server accesses a WWW server of the BPS server 1 from a Web browser, obtains a page including a user interface for making an advertisement distribution request in the HTML format, and displays the user interface on the Web browser.

Figure 14A:
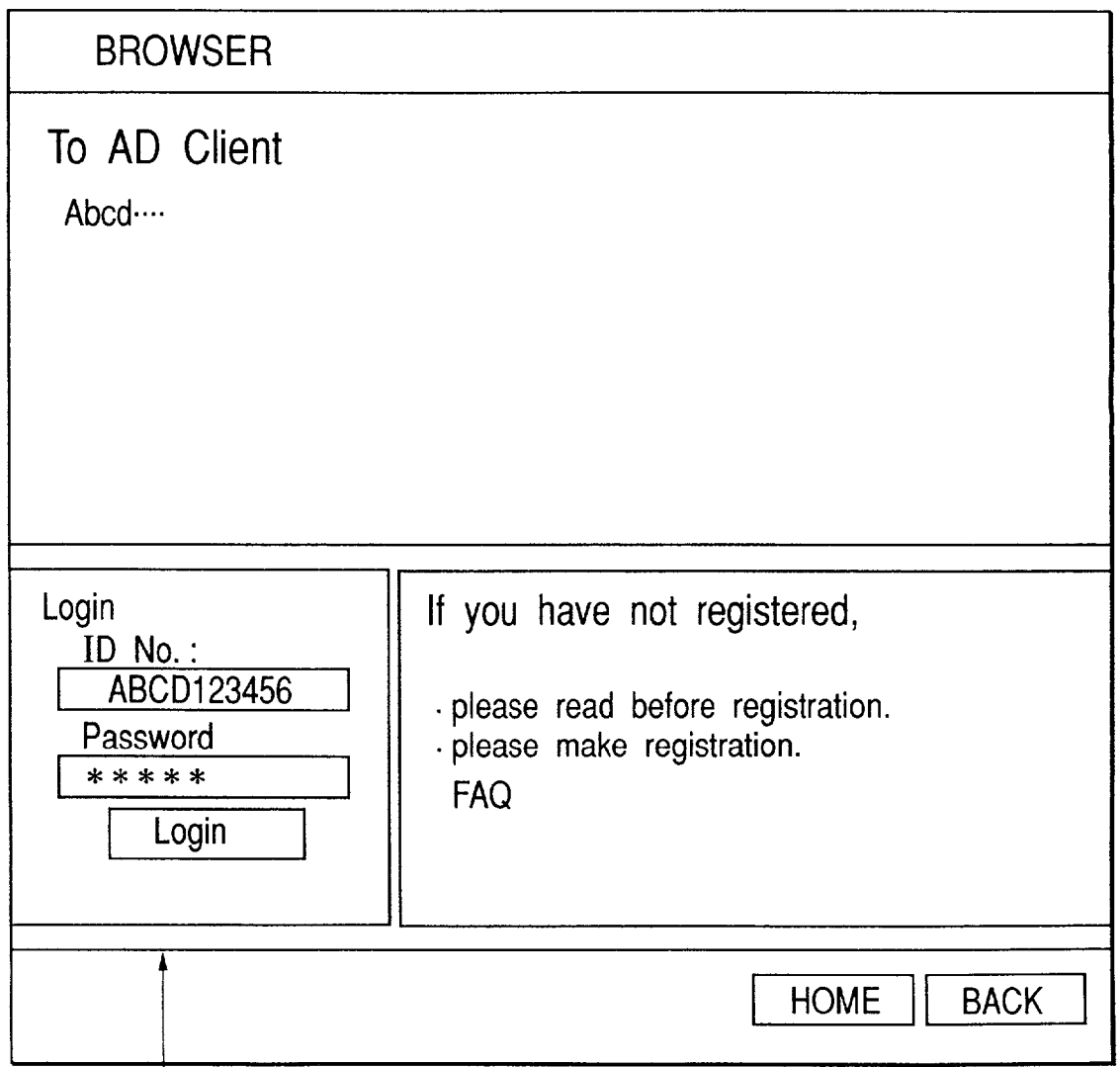

FIGS. 14A and 14B illustrate an example of a user interface to be displayed on a browser when registration of advertisement distribution is processed in an advertisement company. The user interface to be displayed in step S1301 is shown in FIG. 14A. FIG. 14A is an image on a Web browser to be displayed at the time of an initial log-in. An advertisement client can input a registration ID number and a password from an input form denoted by reference numeral 209. The advertisement company server 2 inputs an ID number of the advertisement company, which has already been distributed from the BPS server 1, in the input form displayed on the Web browser, and sends the advertisement company ID to the BPS server (S1302).

In step S1303, the advertisement company server 2 waits for an approval of the BPS server 1 and, when an approval is obtained, browses a registration screen of advertisement information provided by the BPS server 1. In step S1304, the advertisement company server 2 being an advertisement client transfers advertisement information that the advertisement company wishes to distribute to the BPS server 1 by the HTTP via the Internet 4 in order to perform processing for registering the advertisement information in the advertisement database 50 of the BPS server 1. It is assumed that the advertisement information is written in a PDF file or an HTML file. The BPS server 1 obtains the advertisement information sent from the advertisement company server 2 and registers the information in the advertisement database 50. The BPS server 1 then generates an HTML format file by the CGI, which includes a form for indicating that the advertisement information has been registered and inputting conditions for selecting a destination user, and distributes the file to the advertisement company server 2. In step S1305, the advertisement company server displays the file received from the BPS server 1 on the Web browser, checks an attribute list of a destination user displayed on the Web browser to find what kind of users the advertisement company wishes to distribute advertisements registered in the BPS server, and returns its result to the BPS server 1 as an argument. As a designation of a destination user, "distribution region", "target age of a distribution user" or "occupation of the distribution user" (see FIG. 14B) can be designated in addition to those in the check list.

Based on distribution destination attribute information with a desired destination sent from the advertisement company server 2 being an advertisement client, the BPS server 1 compares the user profile DB 6 and the above-mentioned distribution destination attribute information, and selects a user who is most beneficial if this advertisement is distributed in step S1306. During this processing, the advertisement company server 2 inputs attributes of an advertisement to be distributed by using a user interface in step S1307. The attributes of this advertisement include, for example, "term during which this advertisement is distributed", "size of print image of this advertisement", "keywords for each genre of advertisement contents" or the like. A selection list of attribute information to be displayed is now shown in FIG. 14B. FIG. 14B is a screen for selecting attributes of an advertisement distribution destination to be displayed on a Web browser. A term for distributing an advertisement and attribute information of a desired distribution destination are inputted on this form. The term for distributing an advertisement is a designation of dates such as "from xxx until xxx", and a keyword for each genre is a designation such as "Japanese style restaurant", "with a coupon" or the like. Here, the inputted attribute information concerning advertisement distribution is sent to the BPS server 1 from the advertisement company server 2 via the Internet in the same manner as designation of a destination user. In addition, designation of a destination user and attribute designation of advertisement information may be simultaneously performed as shown in FIG. 14B, which are simultaneously sent to the BPS server 1 from the advertisement company server 2 in this case.

The attribute information sent from the advertisement company server 2 to the BPS server 1 is, in association with advertisement information, registered in the advertisement attribute information database 203 of the BPS server 1. In addition, the BPS server 1 estimates an amount of expendable supplies to be used in print processing on a printer of a user based on "size information of a print image of an advertisement" included in the attribute information of the advertisement, determines a point value of the P-point (printer point) for making expendable supplies to be free of charge. This P-point value is, in association with the advertisement, also registered in the advertisement attribute information database 203. Utilization of the P-point is described later.

Processing for estimating charges in the current advertisement distribution for the advertisement client is executed in this way based on the registered advertisement and attributes of the advertisement in the BPS server 1. In step S1308, the advertisement company server 2 receives a result of the estimation, and executes an order after confirming the estimation. Lastly, in step S1309, the advertisement company server 2 terminates the registration processing of the advertisement in the BPS server 1, and logs off the BPS server.

As described above, an advertisement company server can register advertisement information in a BPS server while requesting a destination user, and an advertisement company can specify a user to whom advertisement information is distributed because a distribution term and advertisement attributes are registered together. Therefore, there is an effect that an advertisement can be efficiently and actively placed compared with the case in which an advertisement is registered in a plurality of home pages, which are likely to be related, to allow unspecified number of users to browse the advertisement as in a conventional banner advertisement of the Internet. In addition, there also is an effect that the advertisement company needs to bear less costs because distribution costs are significantly reduced compared with those for direct mails.

Figure 15:
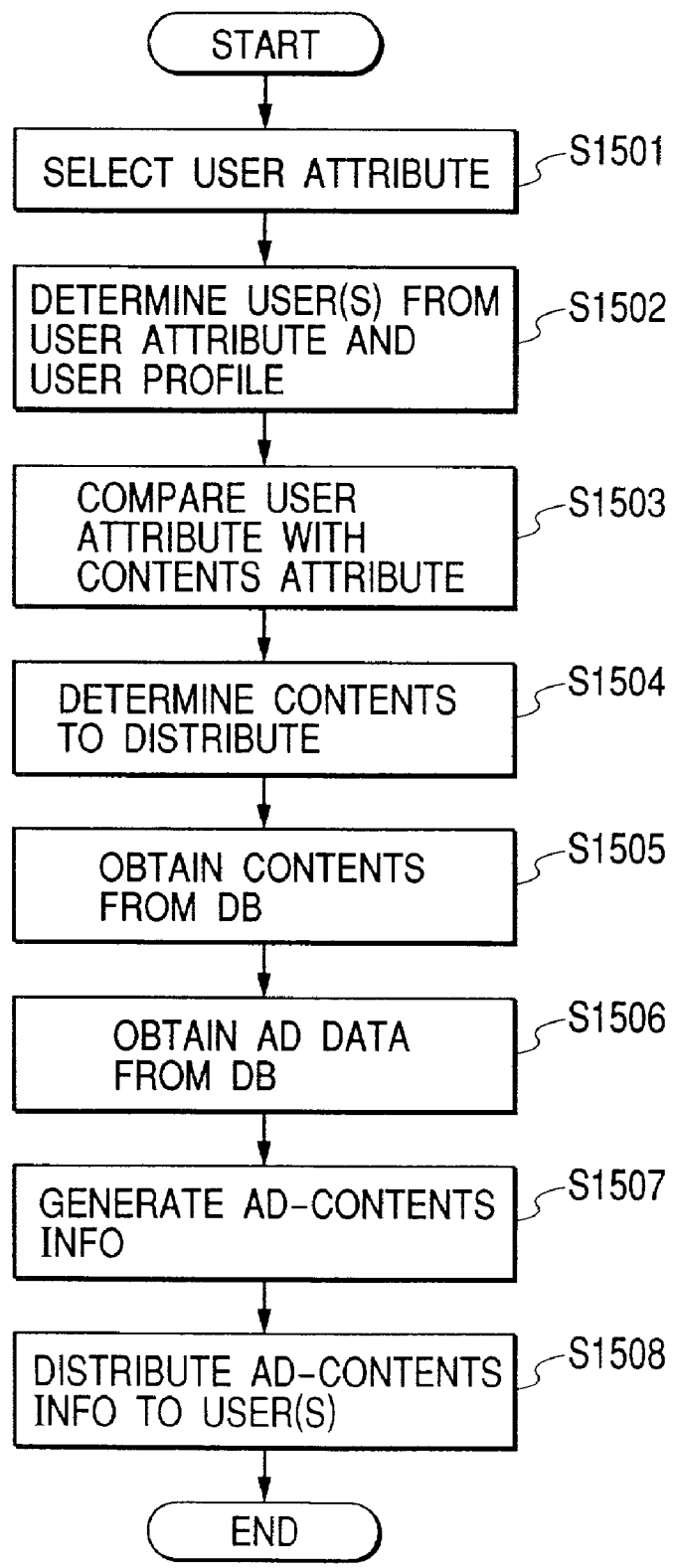
FIG. 15 is a flow chart showing second control processing in the BPS server.

FIG. 15 is a flow chart showing processing for retrieving a destination user designated by an advertisement company in a BPS server and multicasting an advertisement to a pertinent user.

In step S1501, the BPS server 1 reads advertisement attribute information associated with a registered advertisement to be held in the advertisement attribute database 203, and recognizes what kind of users the advertisement company wishes to distribute target advertisement information. More specifically, "place of living of a distribution user", "target age of a distribution user", "occupation of a distribution user", "sex of a distribution user", "family members of a distribution user" and "content attributes of advertisement information" are obtained out of keywords included in the advertisement attribute information.

In step S1502, the BPS server 1 compares the destination attribute information obtained from the advertisement attribute database 203 with user profiles registered and managed in the user profile DB 6 to select beneficial users who match a condition for distributing an advertisement of an object of processing.

In step S1503, the BPS server 1 reads out contents desired by distribution users selected in the preceding step for each user. Then, in step S1504, the distribution manager 60 of the BPS server 1 determines each content to be distributed to respective users based on the contents attribute information database 76.

Then, in step S1505, each content determined by the distribution manager 60 is read out from the contents database 49 and is transferred to the distribution image generator 53. In addition, in step S1506, advertisement data to be added is read out from the advertisement database 50 by the distribution manager 60 and is transferred to the distribution image generator module 53 in the same manner. Advertisement information to be read out here is to be selected by the distribution manager 60 for each user based on a user profile held in the user profile DB 6.

Then, in step S1507, the distribution image generator module 53 applies arrangement determination processing of a distribution image with a layout different for each user to the transferred content and advertisement information. When the layout arrangement processing is executed, in step S1508, the print information distribution engine 54 of the BPS server 1 reads out a printer driver corresponding to each user from the printer driver DB 7 based on distribution information generated by the distribution image generator module 53 to activate it, thereby generating print information for each user. Thus, print information is distributed to a plurality of pertinent users by an application server 57.

Further, although print information is distributed to a plurality of users, the distribution forms actually monocast distribution because different print information is distributed with different layout for each user. However, in the case where a size of advertisement information is large and contents information is not added to an advertisement, a layout of distribution information is identical for all the users, and print information varies according to types of printers used by the users. In this case, a printer driver corresponding to a printer currently used multicasts print information for an identical user.

As described above, a user suitable for a designated condition is retrieved to actively distribute advertisement information registered by an advertisement company to pertinent users in a BPS. Thus, there is an effect that advertisement information can be effectively sent only to customers desired by the advertisement company and distribution costs are significantly reduced compared with those for direct mails.

In addition, print information arranged and generated with a layout suitable for each user is distributed. Thus, there is an excellent effect that a user can obtain only desired information and can obtain an output image of higher resolution.

In addition, if distribution information consisting of advertisement information is sent, a layout of the distribution information is the same for all the users, and identical print information can be multicast to users using an identical printer. Thus, there is an effect that loads on a cable network can be reduced.

Figure 16:
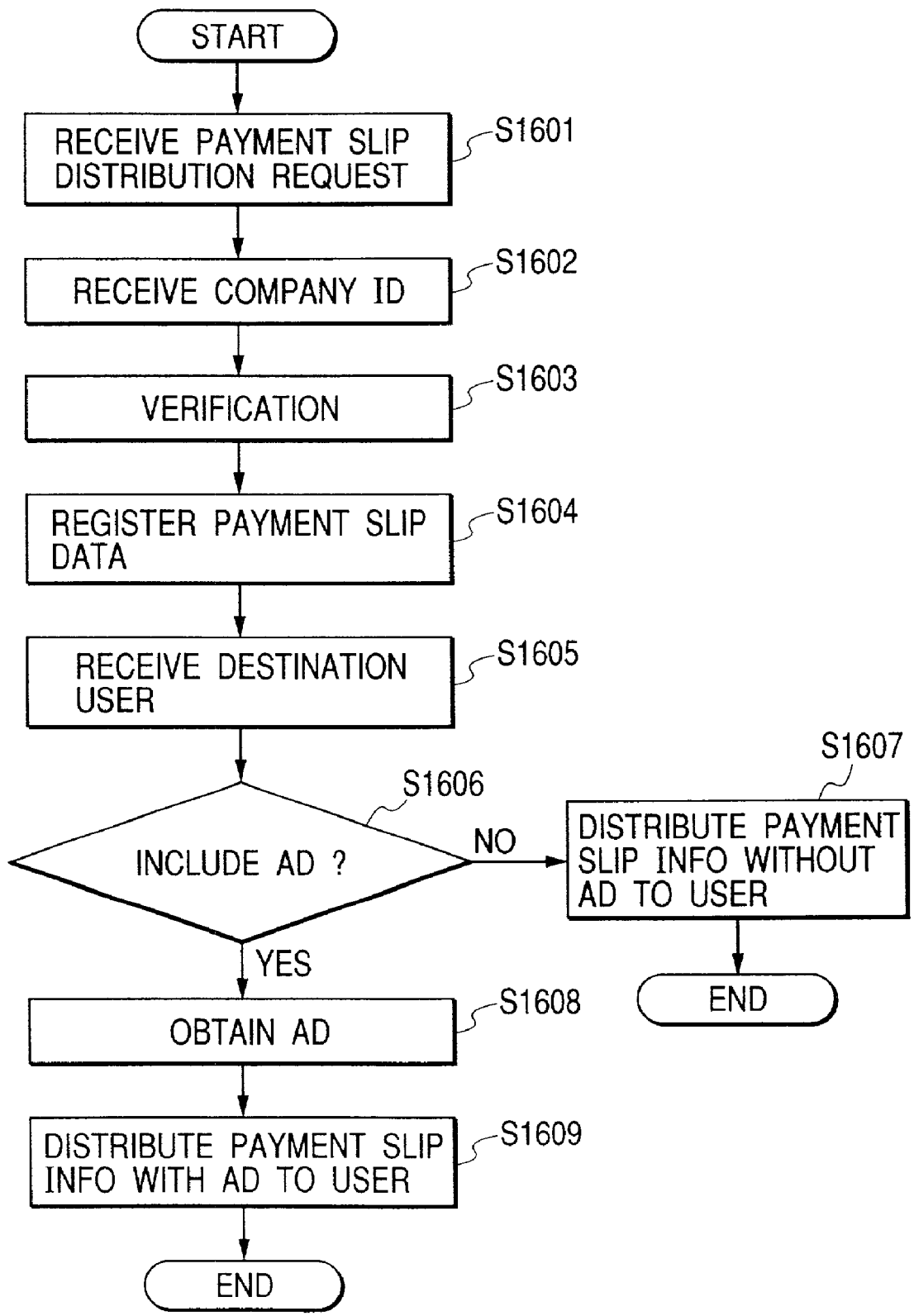
FIG. 16 is a flow chart showing third control processing in the BPS server.

A mechanism for distributing contents such as a use record and a payment slip to a user will be described next. FIG. 16 is a flow chart showing processing in response to a payment slip distribution request from the contents servers 3a and 3b, which are companies, and singlecasting (monocasting) a payment slip to pertinent users in a BPS.

In step S1601, the BPS server 1 receives a payment slip distribution request from the contents server 3 of use records and payment slips. This processing is for a Web browser of the contents server 3 to access the BPS server 1 and notify a payment slip distribution request similarly to advertisement registration processing and contents registration processing. Subsequently in step S1602, the BPS server 1 receives an input of a registration ID number and a password from the contents server. Then, in step S1603, the BPS server 1 verifies the registration ID number and the password received from the contents server 3 and, if they are correct, the BPS server 1 allows login from the contents server 3.

In step S1604, the BPS server 1 receives payment slip data that is requested to be distributed from the contents server 3 via the Internet, and registers the received payment slip data in the payment slip database 51. Then, in step S1605, the BPS server 1 receives information of a destination user to whom a payment slip is distributed from the contents server 3. Subsequently in step S1606, the BPS server 1 receives information on whether advertisement inclusion is appropriate when the payment slip is distributed from contents server 3, and determines whether or not the payment slip should distribute with an advertisement. If the payment slip is distributed without an advertisement, in step S1607, the BPS server 1 generates print information in the same manner as the above-mentioned processing based on the payment slip information registered for the user designated by the contents server 3, and scrambles the print information to singlecast it to the user via the cable network 9. The BPS server 1 further accumulates results of receiving by the user to whom the print information has been distributed, and terminates the processing.

In addition, if it is determined in the step S1606 that an advertisement should be attached, the BPS server 1 selects from the advertisement database 50 an advertisement to be attached to a payment slip to be distributed with reference to the user profile DB 6 in S1608 and based on a profile of a user intended to distribute. Then, the BPS server 1 generates a layout in which an advertisement is attached to the payment slip to be distributed in the distribution image generator module 53. In step S1609, the BPS server 1 reads out a printer driver by the rasterizer 56 and activates it in the same manner as the above-mentioned processing. Then, the BPS server 1 further scrambles the print information, and distributes the print information of a payment slip with an advertisement to a designated user by the application server 57 via the cable network 9. Then, the BPS server 1 accumulates results of receiving of users to whom the print information has been distributed and terminates the processing.

As described above, a BPS server receives a distribution request of contents such as a payment slip from a contents server such as a bank to register the contents, and the contents are actively distributed. Therefore, a payment slip can be distributed simply and with lower costs than a direct mail to a user designated by the contents server.

In addition, information to be distributed is scrambled using a cable network. Therefore, there is an effect that excellent security is realized and leakage of information lessens compared with the case in which information is mailed or sent by public lines.

Figure 17:
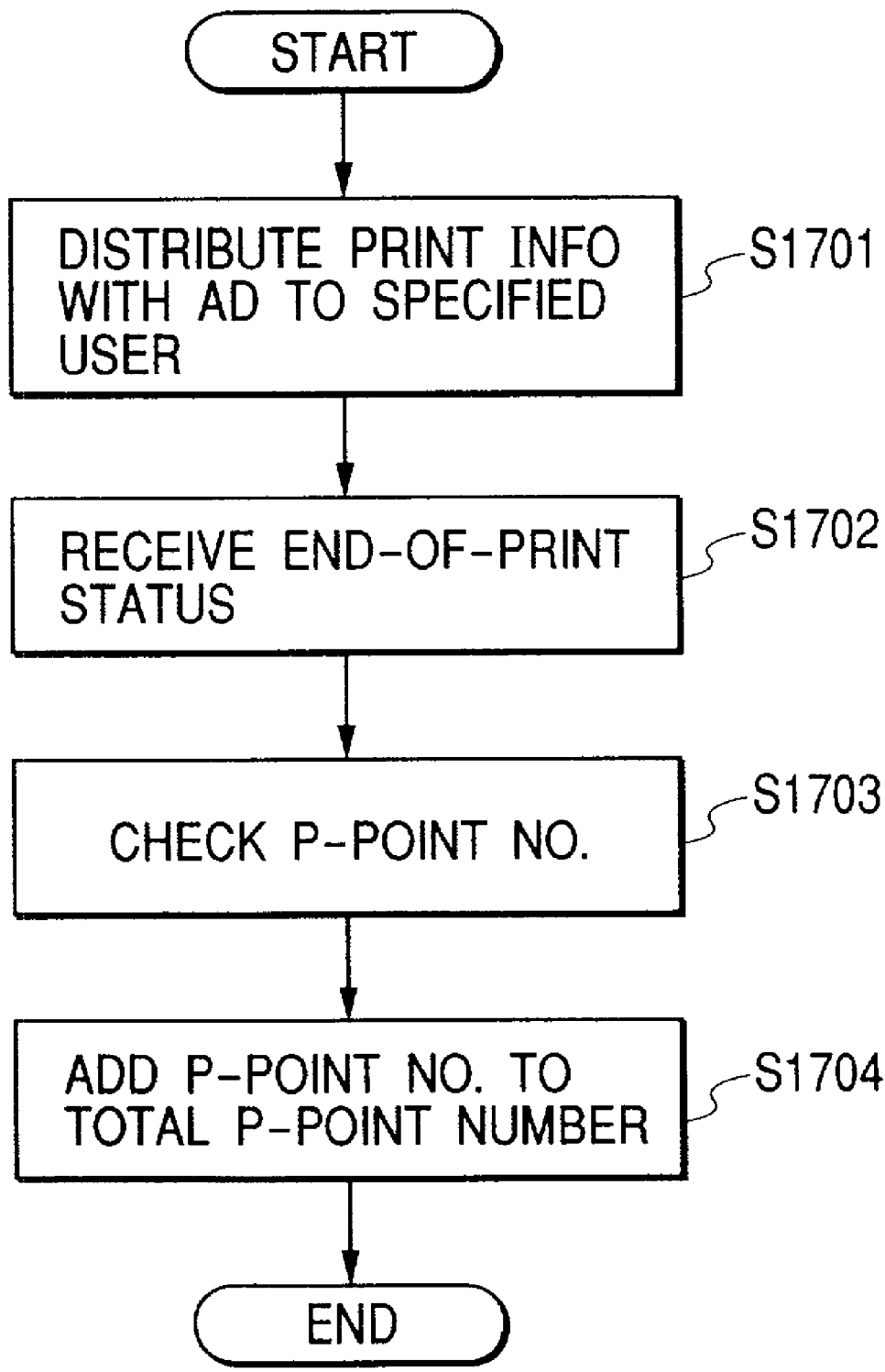
FIG. 17 is a flow chart showing fourth control processing in the BPS server.

A mechanism for making expendable supplied free of charge for a user who has printed advertisement information that is a content for which expendable supplies are free will now be described. FIG. 17 is a flow chart showing accumulation processing of a P-point (print point) in a BPS server.

First, in step S1701, the BPS server 1 prepares print distribution information such as contents with an advertisement and a payment slip for distribution to a user, and distributes print information with advertisement information to a specific user. The STB 11 in a destination user receiving the print information returns a status of end-of-print to the BPS server 1 when it receives the print information and printout is finished by the printer 12. In step S1702, when the BPS server 1 receives the end-of-print status sent from each STB 11, the processing advances to the next step S1703.

In step S1703, the BPS server 1 confirms the P-point number granted to the user when the user receives the print information distributed this time. The BPS server 1 reads out attribute information from the advertisement attribute information database 203 concerning all pieces of advertisement information attached to the print information distributed this time, adds the P-point in the attribute information, and obtains the total P-point number corresponding to the distributed print information.

Then, in step S1704, the BPS server 1 also adds the P-point number in the print distribution information received this time to the P-point number of the user, who received the print information this time, accumulated to that point in the distribution module 53 based on the end-of-print status received from each user, and updates the user profile DB 6 again.

In this way, a BPS server adds the P-point to a user who printed the print information in which advertisement information is included and updates a user profile. Therefore, there is an effect that a user can accumulate P-points as much as the user prints advertisement information, and can easily request to have record color material such as ink and toner as well as a recording medium sent.

Figure 18:
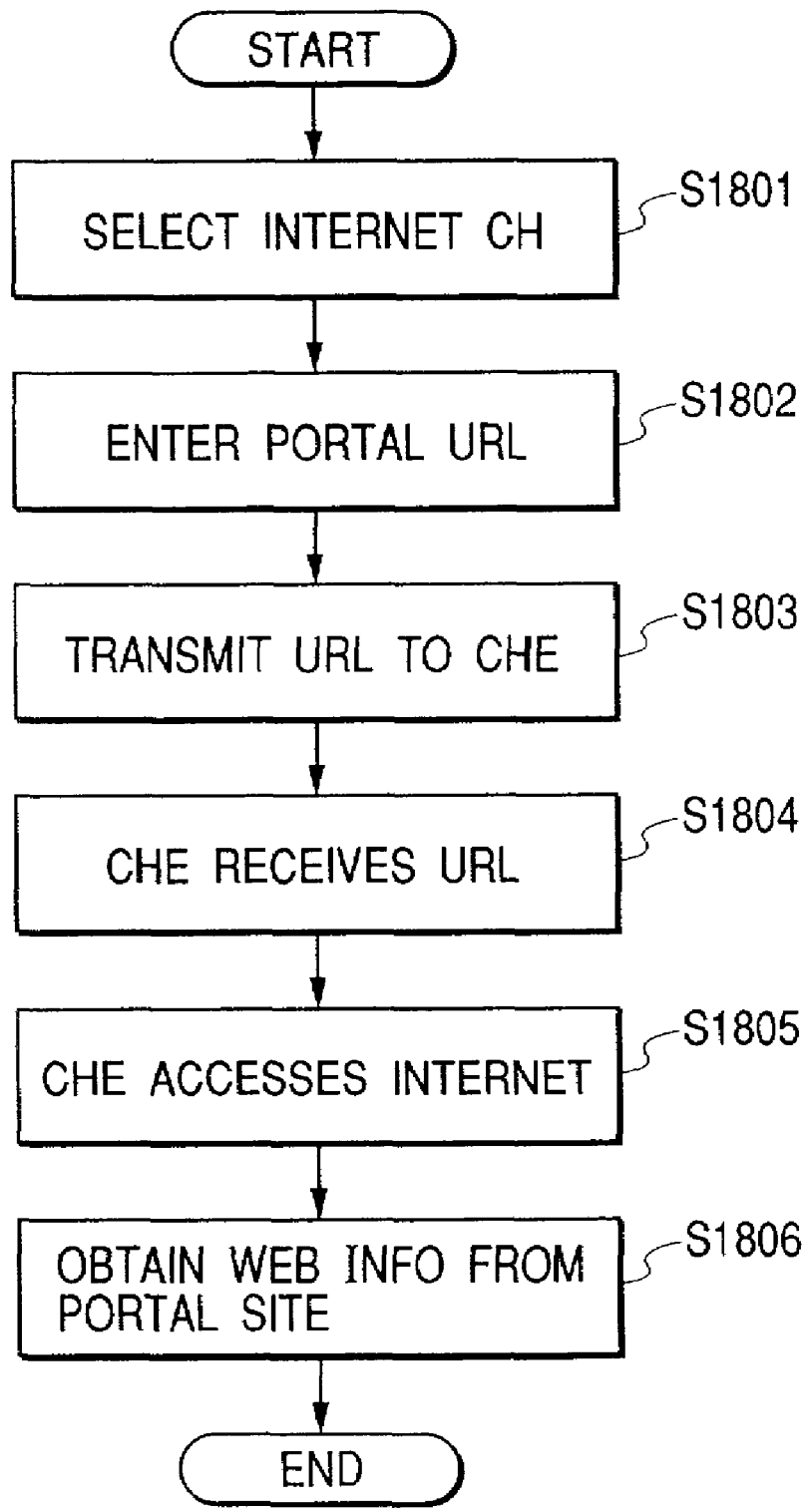
FIG. 18 is a flow chart showing processing of connection to a portal site from the STB.

Access processing to a portal site will now be described which realizes processing of sending expendable supplies free of charge such that a user request to have expendable supplies sent free of charge utilizing accumulated P-points. FIG. 18 is a flow chart showing processing of connecting from the STB 11 to a portal site for sending expendable supplies. This processing is executed by a user requesting "connection processing to a portal site" operating a remote control of the STB 11

In step S1801, the STB 11 selects an Internet CH (channel) to select a service of Internet connection among channels of a cable TV, and allows a user to make a connection to the Internet via the TV screen 13. In the following step S1802, the STB 11 automatically inputs a URL of a portal site of a company operating a BPS service in a form for inputting a URL of a browser displayed on the TV screen 13. This is realized by receiving a URL of a portal site when receiving information distribution from the BPS server 1, holding information of the URL in the IC card 21 or a not-shown NVRAM in advance, and reading out the URL therefrom.

In step S1803, the STB 11 sends the inputted URL to the CHE 8 via the cable network 9, and issues a request for obtaining information of the destination URL. In step S1804, the CHE 8 receives the URL sent from the STB 11. Then, in step S1805, the CHE 8 demodulates the information for accessing the Internet by a received signal, and accesses the Internet via a gateway provided in the CHE 8. In step S1806, the STB 11 obtains Web information from the portal site of the company operating the BPS service via the CHE 8 to display a top page to the portal site of the company operating the BPS service on the TV screen 13, and terminates the processing.

In this way, the STB 11 holds the URL obtained upon receiving information distribution from the BPS server 1, and reads out the URL to instruct the CHE 8 to access a portal site, thereby automatically realizing an access to a portal site providing expendable supplies. Therefore, there is an effect that a user can make a connection to a portal site without searching it and bears less burdens.

Figure 19:
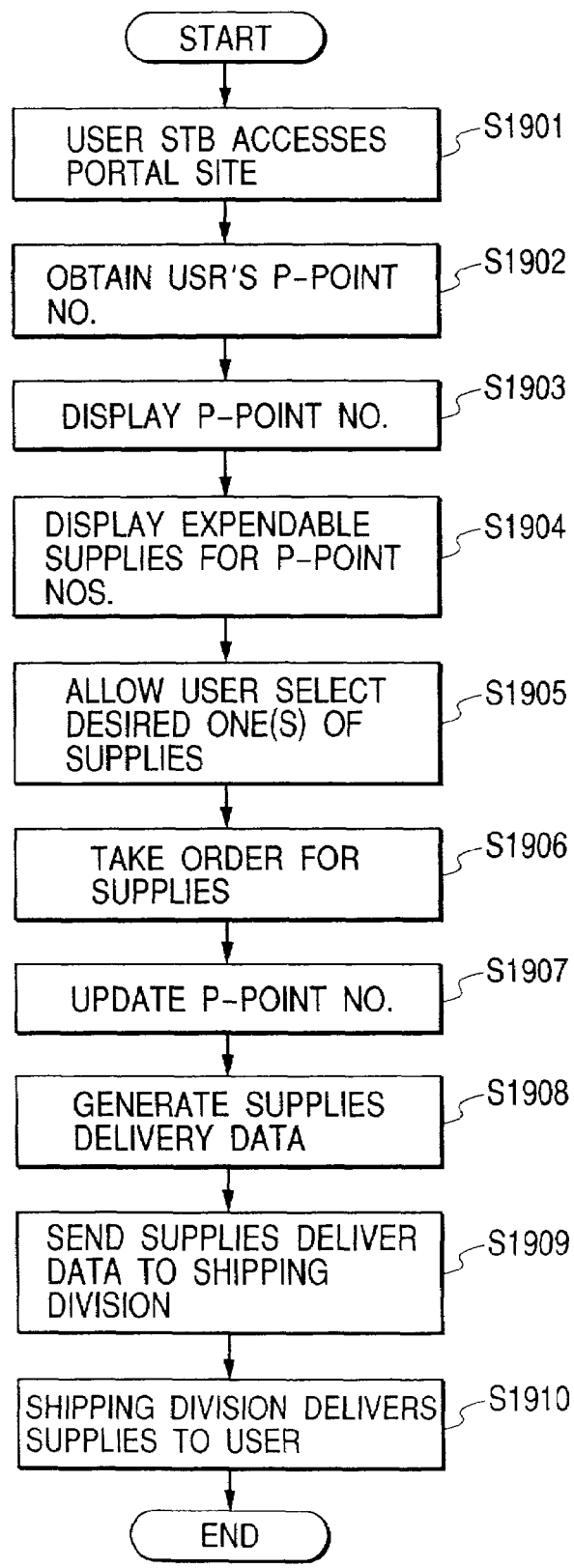
FIG. 19 is a flow chart showing control processing in a portal site server.

Delivery processing for a user to have expendable supplies distributed free of charge utilizing accumulated P-points in the accessed portal site will now be described. FIG. 19 is a flow chart showing processing for receiving a request and mailing arrangement for expendable supplies in a portal site server. This processing is started by the STB 11 accessing a portal site of a company operating a BPS service of a user who receives print information (distribution information).

In step S1901, the STB 11 of the user receiving print distribution information connects to the portal site of the company operating the BPS service via a channel of Internet connection of a cable TV and accesses a home page for requesting expendable supplies as shown in FIG. 18. As describe above, a service of expendable supplies request by a user who receives this print distribution information is a system in which print distribution information is sent to the user from the BPS server 1, and when the user receives the sent print distribution information, the P-point is given to the user as the user's result of receiving the print distribution information. Therefore, the user can receive expendable supplies such as ink for a printer, paper or the like in exchange for this P-point.

In step S1902, a server of the portal site of the company operating the BPS service obtains a user ID from the STB of the user currently accessing it who receives the print distribution information, and requests the number of P-points of the user from the BPS server 1 via the Internet based on the user ID to obtain it. When the BPS server 1 receives a request for obtaining the P-point from the portal site server with the user ID used as an argument, the distribution record manager module 61 refers to a value of a table in which the number of P-points of the pertinent user is recorded based on the user ID, and returns the P-point to the portal site server. In addition, processing for obtaining a user ID in step S1902 can be performed simultaneously with step S1901 if the user accessed the portal site at least once in the past. In that case, when the user accesses the portal site for the first time, the user ID is recorded in a browser (Windows CE is generally used) in the STB 11 as "cookie" information. Then, when the browser in the STB accesses the portal site server next, the portal site server sees the "cookie" to recognize the user and confirms the user ID. However, in this case, it is not desirable to leave the user ID itself of the main service, and it is rather desirable to manage the user ID of the main service in the portal site server and leave a user ID given to the user anew in the portal site server in the "cookie" considering security. In this way, the processing of step S1901 to the processing for obtaining a user Id in step S1902 can be simultaneously performed when the portal server is accessed for the second time or more.

In step S1903, the portal site server returns the number of P-points of the user currently accessing it acquired from the BPS server 1 to the STB 11. Through such processing, the STB 11 can display P-points accumulated of the user on the browser of the TV screen 13. The STB 11 notifies the user of the number of points of the user currently accessing it by this process.

Then, in step S1904, the portal site server generates a list of expendable supplies associated with the number of P-points as expendable supplies provision information written in the HTML format in order to allow the user to select expendable supplies and instruct delivery according to a P-point. The list consists of P-points of a user and a list of associated expendable supplies in which consumption points required for providing expendable supplies. The portable site server sends the list to the STB 11 via the Internet 4 and the cable network 9, and the STB 11 displays a list of expendable supplies associated with the number of P-points shown in FIG. 20 on the browser of the TV screen 13. The list of expendable supplies associated with the number of P-points includes a list of expendable supplies in which a recording color material such as ink and a recording medium such as paper which the user requests delivery in exchange for a P-point are included.

Figure 20:
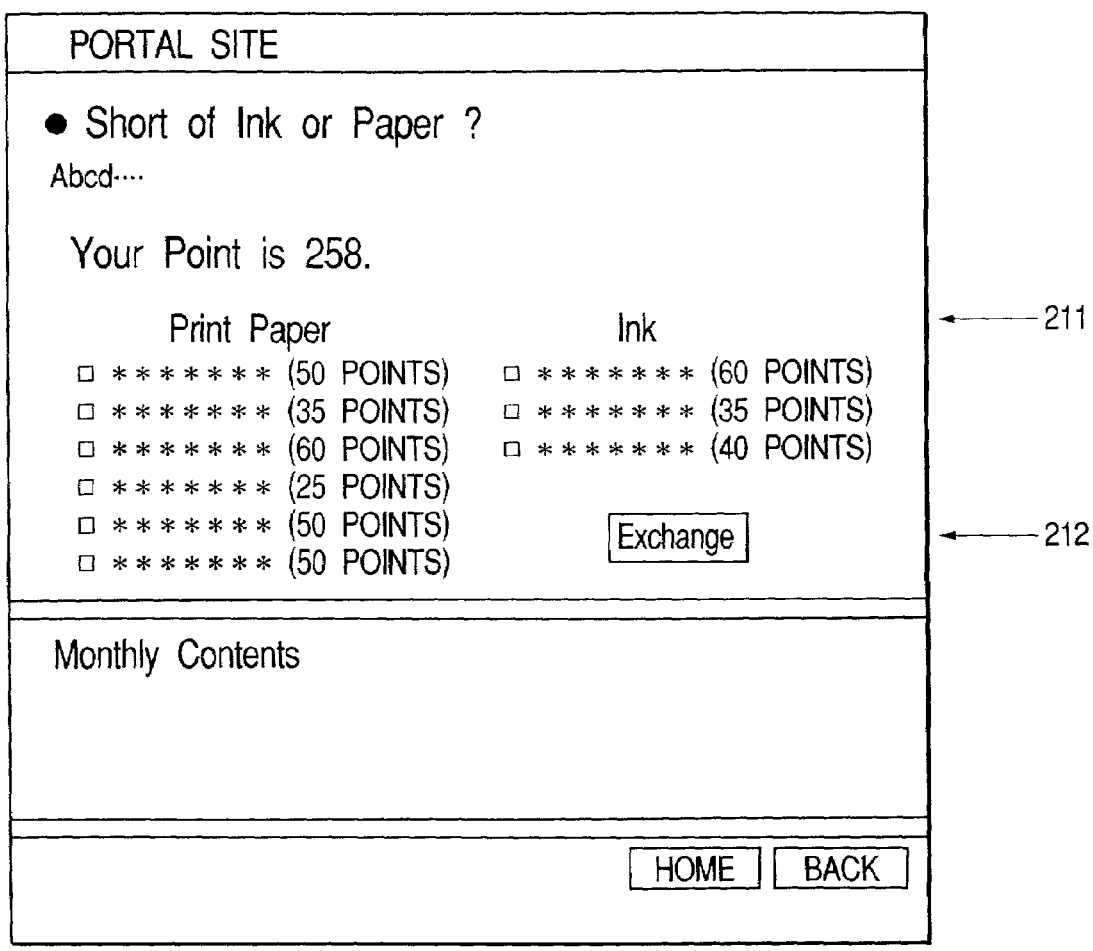
FIG. 20 illustrates a user interface showing an expendable supplies request screen displayed on a TV via the STB by an HTML document transmitted from the portal site server.

FIG. 20 illustrates a user interface showing an expendable supplies request screen displayed on the TV display 13 via the STB according to expendable supplies provision information in the HTML format to be sent from a portal site server. In an area denoted by reference numeral 211, the current number of P-points of a user currently accessing a portal site which is acquired by the portal site server from the distribution record manager module 61 of the BPS server 1 is shown. An area denoted by reference numeral 212 shows a list of expendable supplies that the user requests delivery in exchange for a P-point, in which a consumption point indicating a point for each item of expendable supplies is displayed. The user having accessed the portal site checks an item of expendable supplies that the user requests in this expendable supplies list and makes an instruction to deliver by pressing an exchange button. Thus the user can notify the portal site server of an item of expendable supplies that the user requests delivery from the STB 11. In addition, contents is obtained from the portal site server and displayed, in which the total number of P-points displayed in an area denoted by reference numeral 210 is updated by subtracting the number of P-points of the selected item of expendable supplies. In addition, a WWW server of the portal site server may generate expendable supplies provision information such that only expendable supplies that can be provided free of charge with a current P-point is displayed in the area of the associated expendable supplies list of the expendable supplies provision information.

Then, in step S1905, the STB 11 allows the user to input an item of expendable supplies selected within the total number of P-points of the user, and sends information of the inputted item of expendable supplies that the user requests delivery to the portal site server. In step S1906, the portal site server confirms a type and a total number of items selected by the user, and determines whether or not the total number is within the current P-point of the user, that is, whether or not the item should be provided free of charge. If it is confirmed that the consumption point of the selected and designated item of expendable supplies is within the P-point, the portal site server notifies the user that the order for the item has been taken. If it is confirmed that the consumption point of the selected and designated item of expendable supplies is equal to or more than the current P-point of the user, the portal site server generates a file of the HTML format explaining that the order of the item cannot be taken because the user has made a selection equal to or more than the P-point or costs for compensating for the shortage of P-point will be incurred, and sends the file to the user via the STB 11. In addition, the portal site does not make a determination in itself, and sends the type and the total number of items of expendable supplies selected by the user to the BPS server 1. The BPS server 1 then determines whether or not the consumption point of the selected item is within the current P-point of the user who executed the selection, that is, whether or not the item should be provided free of charge. A result determined by the BPS server 1 is sent to the portal site.

If it is determined that the consumption point of the selected item is within the current P-point of the user, or if it is confirmed that the user will pay costs for compensating for shortage of the P-point, the order of the item of expendable supplies is considered to be formally taken. Then, in step S1907, the portal site server comuptes a new number of P-points by subtracting the number of P-points used in the request for the item of expendable supplies this time based on the correspondence table in which items of expendable supplied managed by itself and P-points. Then, the portal site server notifies the BPS server 1 of the updated P-point via the Internet. The BPS server 1 having received the updated P-point updates the total number of P-points of the user in profile data to be stored in the user profile DB 6 by the distribution record manager module 61, and saves the updated value in the user profile DB 6 again.

In step S1908, the portal site server requests and obtains user information such as an address of the user who changed the P-point to the item of expendable supplies this time from the BPS server 1. Then, the portal site server prepares a list of the obtained user information and the item selected by the user as expendable supplies delivery data.

Then, in step S1909, the portal site server sends the prepared expendable supplies delivery data to a shipping division server of a sales company of a company operating the BPS service. In step S1910, the shipping division server prints and outputs a delivery slip in which the address of the user and a method of paying the balance based on the received expendable supplies delivery data, and lets a deliverer to surely deliver the item selected by the user to the designated user's home. In this way, the deliverer can easily recognize information required in delivering an item, such as which item of expendable supplies is delivered to which address, and whether a method of paying the balance is cash on delivery or payment into a bank account if there is the balance.

In addition, the BPS server 1 and the portal site may be an identical server. In that case, time and labor required for processing for acquiring the P-point of step S1902 and processing for notifying update of a P-point of step S1907 can be saved. In this way, the user can access the portal site server from the STB 11 and request expendable supplies using the user interface displayed on the TV screen, and exchanges the P-point accumulated by printing advertisement information for expendable supplies. Therefore, expendable supplies can be obtained without any costs or for a discounted price, and costs born by the user can be significantly reduced.

Figure 21:
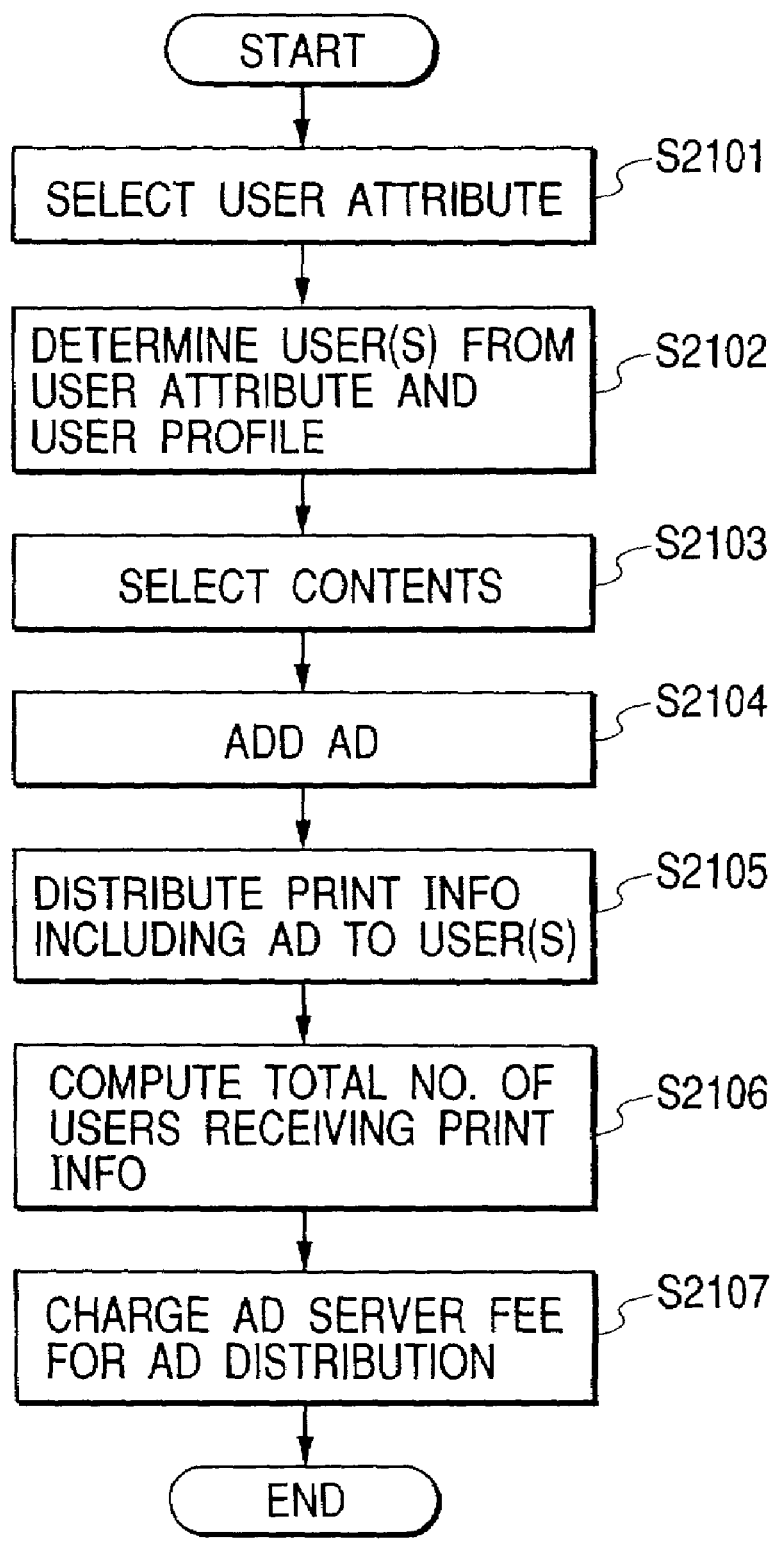
FIG. 21 is a flow chart showing fifth control processing in the BPS server.

Charge processing between an advertisement company server and a BPS server which takes place by distributing print information including advertisement information will now be described. FIG. 21 is a flow chart showing charge processing in the case of contents distribution with an advertisement in a BPS.

In step S2101, the BPS server 1 receives attribute information of users who desire distribution of advertisement information from the advertisement company server 2 requesting advertisement. Then, in step S2102, in order to select destination users desired by the advertisement server, the BPS server 11 refers to and retrieves through profiles of respective users managed in the user profile DB 6 based on the attribute information of the users who desire distribution, and determines destination users of print distribution information of this time. This retrieval varies depending on attribute information of the users who desire distribution. For example, the BPS server 1 retrieves addresses of the user profiles if a designation of the attribute information is "region", retrieves ages of the user profiles if the designation of the attribute information is "age", and retrieves "genre of interest" of contents histories of the user profile if the designation of the attribute information is "genre".

Then, in step S2103, the BPS server 1 determines contents to be added to advertisement information and sent to users to whom the advertisement information is determined to be distributed. This processing is realized by the BPS server 1 comparing user profiles of the users to whom the advertisement information is determined to be distributed with the contents attribute database 76 to determine contents that respective users desire, and transferring the contents selected from the contents database 49 to the distribution image generator 53. In addition, as described above, advertisement information may be attached later. In that case, when distribution of free contents such as a use record and a payment slip that are requested by the contents server 3 to distribute is processed, advertisement information that should be distributed to the user is retrieved from the user profile DB 6 by the above-mentioned processing, and the advertisement information is attached to the contents. In addition, distribution of charged contents such as article/news contents or image contents to be distributed according to a request from a user is carried out at one time or regularly with a time designation. When this distribution is processed, advertisement information is retrieved in the similar manner, and the advertisement information is attached to the contents.

Then, in step S2104, the distribution image generator module 53 of the BPS server 1 determines a layout arrangement as distribution information from the distribution contents selected in the preceding step and the advertisement information to be forwarded to the destination user this time. The distribution image generator module 53 then generates distribution information, and notifies the print information distribution engine 54 that the information that should be distributed has been generated.

Subsequently in step S2105, the print information distribution engine 54 of the BPS server 1 sends distribution information including the advertisement information generated by the distribution image generator module 53 to the rasterizer 56. The rasterizer 56 reads out a printer driver from the printer driver DB 7 and activates it to generate print information of a rasterized image from the distribution information, and returns the print information to the print information distribution engine 54. The print information distribution engine 54 distributes the prepared print information from the application server 58 to the STB 11 of each user home via the CHE 8 and the cable network 9. Further, if a desired distribution time is designated in user profiles in the user profile DB 6, a schedule is managed by the scheduler 55, and a time for activating the print information distribution engine 57 is controlled for each user.

When the STB 11 installed in each user home receives this print distribution information and sends the print distribution information to the printer 12 by the above-mentioned processing, and the entire print distribution information is printed by the printer 12, the STB 11 sends a print end status to the BPS server 1. When the BPS server 1 receives the print end status, the BPS server 1 computes the total number of users who has printed and received the distributed print information in step S2106. This value is updated every time the print end status is received.

Then, in step S2107, the BPS server 1 computes an advertisement distribution fee concerning the advertisement distribution in this time to generate charge information based on a print size of print information (applied to charge for expendable supplies because this relates to a P-point of expendable supplies) and a computed and updated result of the number of users to whom the print information is distributed. The BPS server 1 sends the generated charge information to the advertisement company server 2 who requests advertisement and charges the costs.

In this way, advertisement information can be distributed to users who are targets of distribution (desiring distribution), and an advertisement costs is charged according to distribution results for users who actually received and printed the advertisement information. Therefore, there is an effect that an advertisement company can effectively place an advertisement. There is also an effect that costs of an advertisement is minimum because the costs are charged based on distribution results, and a service is easily used because the costs is charged after the advertisement distribution.

Figure 22:
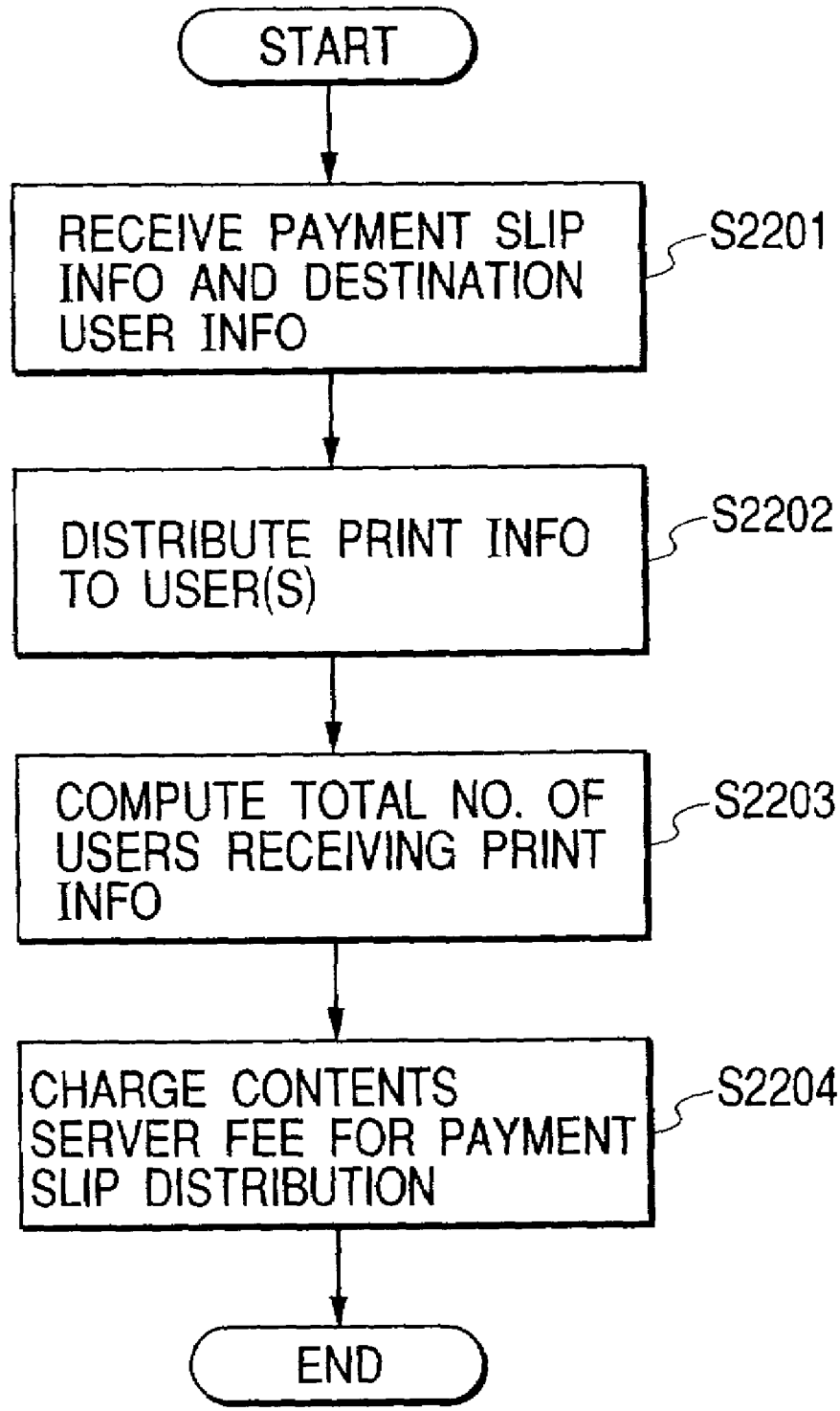
FIG. 22 is a flow chart showing sixth control processing in the BPS server.

Charge processing between a contents server and a BPS server concerning information sending costs generated by distributing contents requested by the contents server will now be described. FIG. 22 is a flow chart showing charge processing in the case of a payment slip distribution request in the BPS server 1.

In step S2201, the BPS server 1 receives text information of a payment slip that users request distribution and information of destination users from the contents server 3 requesting a payment slip. Here, the BPS server 1 estimates a payment slip distribution fee from the number of users to whom contents are distributed, and notifies the contents server 3 requesting a payment slip of a distribution fee estimation.

Getting an approval on the distribution fee estimate from the contents server 3, in step S2202, the BPS server 1 reads out a printer driver corresponding each user and generates print information of a raster image by developing distribution information in the same manner as the above-mentioned processing in order to distribute payment slip print information to users designated by the contents server 3, respectively. Then, the BPS server 1 scrambles the generated print information by user ID and singlecasts (transmission to one designated user) the print information to designated users via the cable network 9. When the printer 12 of each user home finishes payment slip printing, the STB 11 returns a print end status to the BPS server 1.

When the BPS server 1 receives a print end status notice from the users and confirms distribution of the payment slip print information, in step S2203, the BPS server 1 confirms users who have finished the payment slip printing from this status for ending the payment slip printing, and computes a total number of users who have printed and received the distributed print information. This value is updated every time the BPS server 1 receives the print end status. Then, the BPS server 1 accumulates distribution results of users to whom the print information have been distributed, and notifies the contents server 3 requesting a payment slip via the Internet. In step S2204, the BPS server 1 also charges the contents server 3 a payment slip distribution fee of this time. In addition, for users who could not print a payment slip due to inability of receiving the print information, the BPS server 1 makes a list of a status indicating reasons for the print inability and information of the users who could not receive the print information, and sends the list to the payment slip client.

Thus, the information distribution system is superior in security compared with the Internet distribution because payment slip information is distributed to designated users via a cable network. In addition, the information distribution system is suitable for keeping secret because contents cannot be found due to scrambling processing by user ID even if an illegal access occurred. In addition, since print information is electronically distributed via a cable network, distribution costs are significantly lowered. Thus, a different payment slip can be distributed to each user at extremely low costs compared with direct mails or the like, and a service that is convenient for a distribution client can be provided. Moreover, there is also an effect that, since users who could not print a payment slip can be specified, a distribution client can surely confirm distribution processing.

Figure 23:
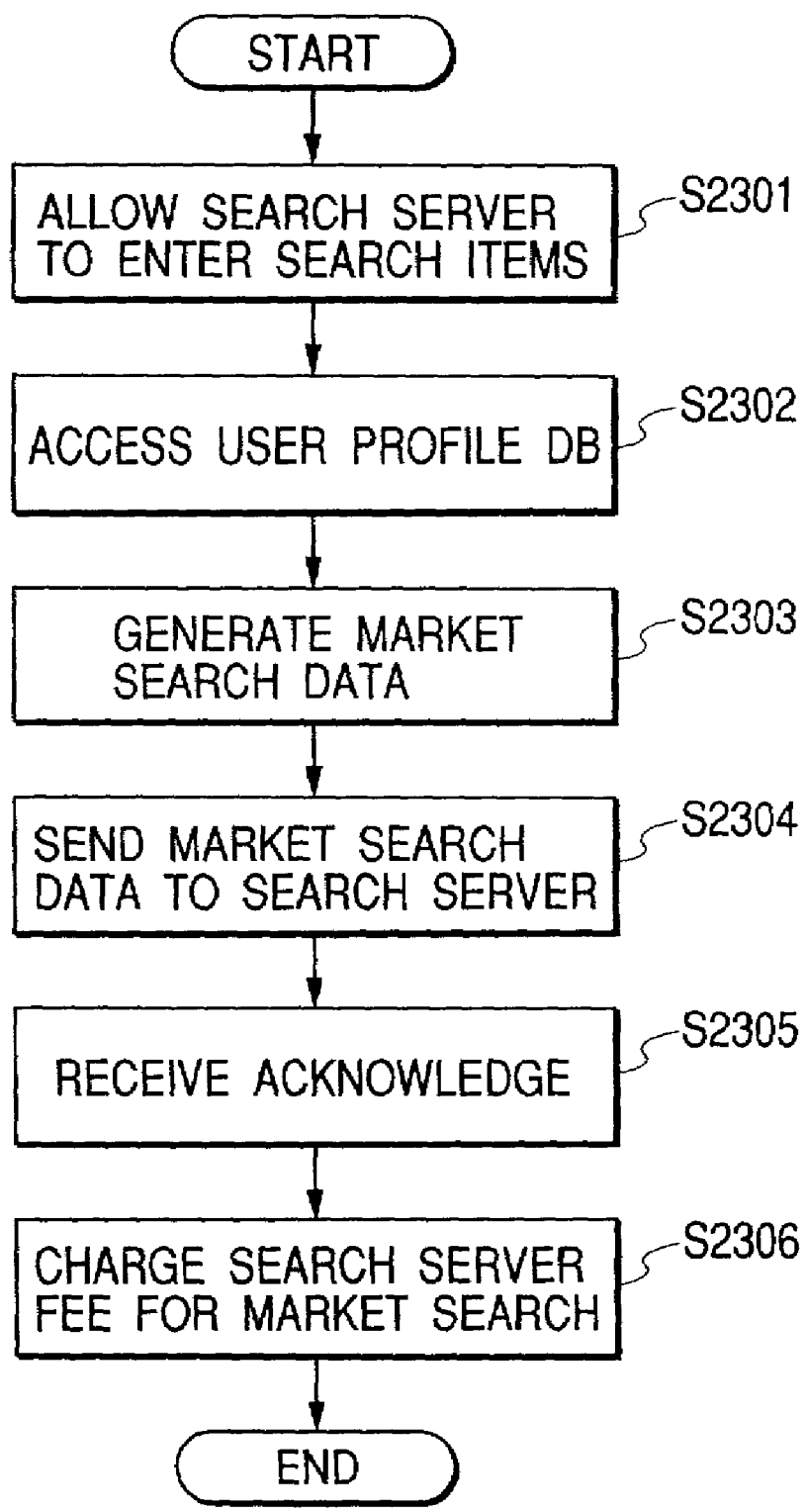
FIG. 23 is a flow chart showing seventh control processing in the BPS server.

Market consulting processing will now be described. FIG. 23 is a flow chart showing market consulting processing in a BPS server.

In step S2301, upon receiving login from a search server (not shown) of a market search client that desires information of users via the Internet, the BPS server 1 prepares a file in the HTML format for providing a user interface to allow the market search client to input search items to indicate information on what kind of users and markets the search server desires, and sends the file to the search server via the Internet. At this point, the BPS server 1 notifies the market search client of an estimation of a market search fee by an identical file.

When the search items are inputted by the search server, in step S2302, the BPS server 1 refers to user profiles registered in the user profile DB 6 based on these search items. Then, in step S2303, the BPS server 1 analyzes the user profiles along the search items inputted by the market search client, and prepares market search data that does not include individual information.

Then, in step S2304, the BPS server 1 sends the market search data prepared by analyzing the user profiles in the preceding step to the market search client via the Internet. Then, in step S2305, the BPS server 1 confirms receipt of the market search data to the market search client. When the receipt is confirmed, in step S2306, the BPS server 1 charges the market search client a market search fee.

In this way, search results to be obtained by analyzing a database in which results of distribution to users are accumulated are provided, which allows market consulting companies to have a site for providing information.

FIG. 24 is an image view illustrating a mechanism of charging in a BPS service. An advertisement client 184 (an advertisement company server) desiring distribution of its own advertisement distributes its own advertisement to a user receiving the BPS service utilizing an advertisement distribution service 190 provided by the BPS server 1. Thus, the advertisement client can surely send advertisement print information to a printer at a user's home 197 as printed information.

The advertisement distribution service 190 means that the advertisement client 184 transfers "attribute information of users that it wishes to distribute" to the BPS server 1 via the Internet, then the BPS server 1 compares user profiles in the user profile DB 6 with the "attribute information that the advertisement client 184 wishes to distribute" transferred from the advertisement client 184 and analyzes them to determine a destination user who is most beneficial for the advertisement client 184. The advertisement client 184 can receive a service in which the BPS server 1 determines a most effective destination user by distributing an advertisement of the advertisement client 184 other than a service for surely delivering requested advertisement distribution information to the destination user. In addition, the BPS server 1 can manage a distribution state in real time via the printer 12 and the STB 11 of the destination user and can notify advertisement client 184 of the distribution results of accurate advertisement information. Thus, the BPS server 1 can propose an accurate charge system for distribution results to the advertisement client 184, and the advertisement client 184 can always investigate a state of distributing its own advertisement to users. The advertisement client 184 pays a distribution fee 191 for an advertisement to the BPS server 1 with respect to this service.

The payment slip client 182 desiring distribution of text information such as a payment slip and a bank use record to specific users distributes such text information to users receiving the BPS service utilizing the payment slip distribution service 186 provided by the BPS server 1. Thus, the payment slip client 182 can receive a service of surely delivering the text information such as a payment slip and a bank use record to the printer at the user's home 197 as printed information. The payment slip client 182 transfers information that it wishes to distribute from a Web browser to the BPS server 1. Thus, since the BPS server 1 manages a distribution service of print information to the user's home, the payment slip client can utilize a low cost service for distribution processing to users. The payment slip client pays the distribution fee 187 to the BPS server 1 for this payment distribution service 186.

The contents provider 183 (contents server) registers contents 188 created by itself in the BPS server 1, thereby taking part in the BPS business. The contents include image contents such as a photograph, article/news contents such as an article or news of a newspaper, weather forecast contents and the like. The contents provider 183 can determine the contents ranking from those which can be inserted free of charge to those which are charged to be inserted. The BPS server 1 distributes the contents in response to a request from the user 197, and receives a contents use fee from the user 197 in accordance with distribution of charged contents. In addition, the BPS server 1 pays a fee for using contents 189 to the contents provider 183 according to results for distributing the registered contents 188 to users.

The market search client 185 desiring information of users of a BPS service receives a consulting service 192 from the BPS server 1. The BPS server 1 receives search items requested by the market search client 185, and, based on the user profile DB 6, provides the consulting service 192 of market search results based on detailed data of the user. The market search client 185 pays a fee 193 to the BPS server 1 for this service.

The user 197 who receives print distribution information from the BPS server 1 receives print information distribution service 200 from the BPS server 1. If the user 197 prints and receives information sent by a print distribution service 200, the user 197 receives a point 201 corresponding to the print information. The point 201 is provided by the BPS server 1 for the user 197 as a fee for the user 197 receiving information of a company side. The user 197 receives the print information distribution service 200, thereby receiving an advertisement of the company side as described above and providing the BPS server 1 with marketing information such as demand information of the user 197. In addition, the user 197 can perform "point-supply exchange" denoted by reference numeral 199 for requesting expendable supplies such as ink and paper in exchange for the point 201 sent from the BPS server 1. This request is sent to a sales company 194, which delivers expendable supplies 196 to the user 197 in exchange for the point 201. A fee 198 incurred here is paid from the BPS server 1 to the sales company 194.

In this way, the BPS server 1 receives a distribution fee from a payment slip client and an advertisement client, receives a charged contents use fee from a user, pays a contents use fee to a contents provider, pays costs for expendable supplies to a sales company, and receives a fee for a service provided for a market search client. Thus the BPS server 1 establishes a charging system and obtains the balance as a profit.

In addition, it is needless to mention that the object of the present invention can be also attained by supplying a storage medium (or recording medium), in which a program code of software for realizing the function of the above-mentioned embodiment is recorded, to a system or an apparatus, and a computer (or a CPU or an MPU) of the system or the apparatus reads out and executes a program code stored in the storage medium. In this case, the program code itself read out from the storage medium realizes the function of the above-mentioned embodiment, and the storage medium storing the program code constitutes the present invention. In addition, it is needless to mention that the present invention includes not only the case in which the function of the above-mentioned embodiment is realized by the computer executing the read out program code but also the case in which an operating system (OS) or the like running on the computer based on an instruction of the program code performs a part or all of the actual processing and the function of the above-mentioned embodiment is realized by the processing.

In addition, since the function processing of the present invention is realized by a computer, a program code itself to be installed in the computer also realized the present invention. That is, claims of the present invention include a computer program itself for realizing the function processing of the present invention.

As described above, a method of supplying such a computer program of the present invention is not limited to causing an FD or a CD-ROM to store it and a computer to read and install it therein. The computer program can also be supplied by connecting to a home page of the Internet using a browser of a client computer to download the computer program itself or a file including a compressed automatic install function from the home page. In addition, the supply of the computer program of the present invention can also be realized by dividing a program code forming the program of the present invention into a plurality of files and downloading each file from a different home page. That is, a WWW server for causing a plurality of users to download a program file for realizing the function processing of the present invention is also included in the claims of the present invention.

In addition, the program of the present invention may be encrypted and stored in a storage medium such as an FD and distribute it to users. Then, users who clear predetermined conditions are allowed to download key information for decryption from a home page via the Internet and to execute the encrypted program using the key information. Thus, it is also possible for the users to install the program in computers to realize it.

As described above, according to the present invention, a type of a printing apparatus to be connected to a set-top box of each user is identified, data that should be printed for specific users is obtained, a printer driver corresponding to the printing apparatus is selected based on the identification information, print information that should be printed by the printing apparatus of the specific users is generated from the data that should be printed using the selected printer driver, and the generated print information is distributed to the set-top boxes of the specific users via a cable line. Thus, it is possible for a user to obtain a print image of high resolution by a printer connected to a set-top box of a TV for home use.

In addition, according to the present invention, selection conditions for selecting distribution information that is obtained from specific users in advance are managed, distribution information that should be distributed to the specific users is collected from information obtained via the Internet based on the managed selection information, print information that should be printed by the specific users is generated based on the collected print information, and the generated print information is actively distributed to the specific users. Thus, it is possible for a user to passively obtain a desired print image and to passively receive print data from the Internet at a designated time to print the data.

In addition, according to the present invention, selection conditions for selecting desired contents information are received from specific users, contents information that should be distributed to the specific users is selected out of contents information collected from a plurality of sites via the Internet, the selected contents information collected form a plurality of sites is laid out as one file to generate distribution information, and the generated distribution information is distributed to the specific users. Thus, burdens on a user and costs of expendable supplies can be reduced by collectively laying out information desired by the user and existing in various locations on the Internet to generate distribution information and distributing the distribution information.

In addition, according to the present invention, distribution information that should be distributed to users designated by an information distribution server is received, print information based on the received distribution information is generated for each user and is distributed to a set-top box of the user, and the set-top box transfers the print information to a printing apparatus to be connected. Thus, active distribution processing with high security is possible for distributing distribution information from an information providing company using a private line of a cable television.

In addition, according to the present invention, profile data of a plurality of users is managed using a database, selection conditions for selecting specific users to whom advertisement information should be distributed are received, the specific users to whom the advertisement information should be distributed are selected based on the received selection conditions and the managed profile data, and the advertisement information is distributed to the selected specific users utilizing a digital broadcasting system. Thus, it is possible for an advertisement company to register advertisement information using the Internet and specify target users to conduct advertisement and publicity activities.

As many apparently widely different embodiments of the present invention can be made without departing from the spirit and scope thereof, it is to be understood that the invention is not limited to the specific embodiments thereof except as defined in the appended claims.

What is claimed is:

1. An information distributing method using a cable line for digital broadcasting, comprising:
   an identification step for identifying a type of a printing apparatus to be connected to a set-top box of each user;
   an obtaining step for obtaining data that should be printed for specific users;
   a selection step for selecting a printer driver corresponding to said printing apparatus based on the identification information;
   a generation step for generating, using said selected printer driver, print information that should be printed by said printing apparatus of the specific users from said obtained data that should be printed;
   a distribution step for distributing said generated print information to set-top boxes of the specific users via said cable line;
   a notification step for receiving a print end notice from said set-top box; and
   a management step for registering and managing the fact that said print information is distributed to the specific users in a distribution history if said print end notice is received.

2. An information distributing method according to claim 1, wherein said identification step identifies the type of said printing apparatus by recognizing a device ID of said printing apparatus to be notified by said set-top box via said cable line.

3. An information distributing method according to claim 1, wherein said set-tap box transfers the distributed print information to the printing apparatus to be connected.

4. An information distributing method according to claim 3, wherein said set-top box separates a print information portion from said distributed information and decodes it to original print information, and transfer said print information to said printing apparatus without displaying it on a monitor.

5. An information distributing method according to claim 1, wherein said cable line is a two-way broad band communication network;
   said distribution step distributes said print information as distribution information together with broadcast information that should be outputted on a display to be connected to said set-top box of the user.

6. An information distributing method according to claim 5, wherein distribution information is separated into said print information and said broadcast information in said set-top box, and said print information is transferred to said printing apparatus without being displayed on said display.

7. An information distributing apparatus for distributing information using a cable line for digital broadcasting, comprising:
   identifying means for identifying a type of a printing apparatus to be connected to a set-top box of each user;
   obtaining means for obtaining data that should be printed for specific users;
   selecting means for selecting a printer driver corresponding to said printing apparatus based on the identification information;
   generating means for generating, using said selected printer driver, print information that should be printed by said printing apparatus of the specific users from said obtained data that should be printed;
   distributing means for distributing said generated print information to set-top boxes of the specific users via said cable line;
   notification means for receiving a print end notice from said set-top box; and
   management means for registering and managing the fact that said print information is distributed to the specific users in a distribution history if said print end notice is received.

8. A computer-readable storage medium storing a control program to be executed in an information distributing apparatus for distributing information using a cable line for digital broadcasting, wherein the control program comprises:
   an identification step for identifying a type of a printing apparatus to be connected to a set-top box of each user;
   an obtaining step for obtaining data that should be printed for specific users;
   a selection step for selecting a printer diver corresponding to said printing apparatus based on said identification information;
   a generation step for generating, using said selected printer driver, print information that should be printed by said printing apparatuses of the specific users from said obtained data that should be printed;
   a distribution step for distributing said generated print information to set-top boxes of the specific users via said cable line;
   a notification step for receiving a print end notice from said set-top box; and
   a management step for registering and managing the fact that said print information is distributed to the specific users in a distribution history if said print end notice is received.

9. An information distributing method of distributing print information via a cable network for a digital broadcasting system to a user who has a set-top box for transferring received print information to a connected printing apparatus, comprising:
   a receiving step for receiving distribution information that should be distributed to a user designated by an information distribution server;
   a generation step for generating print information based on said received distribution information for each user;
   a distribution step for distributing said print information generated for each user to said set-top box of the designated user utilizing said cable network;
   a notice receiving step for receiving a notice of a processing result of said print information from said set-top box; and an update step for updating a distribution history of said distribution information if a print end notice of said print information is received from said set-top box in said notice receiving step.

10. An information distributing method according to claim 9, wherein said distribution step distributes said print information after scrambling it.

11. An information distributing method according to claim 9, further comprising:
a notification step for notifying said information distribution server that a notice cannot be sent to a user if a print error notice is received from said set-top box.

12. An information distributing method according to claim 9, wherein said information distribution server is a server of a bank that desires distribution of a use record as distribution information.

13. An information distributing apparatus for distributing print information via a cable network for a digital broadcasting system to a user who has a set-top box for transferring received print information to a connected printing apparatus, comprising:
receiving means for receiving distribution information that should be distributed to a user designated by an information distribution server;
generating means for generating print information based on said received distribution information for each user;
distributing means for distributing said print information generated for each user to said set-top box of the designated user utilizing said cable network;
notice receiving means for receiving a notice of a processing result of said print information from said set-top box; and
update means for updating a distribution history of said distribution information if a print end notice of said print information is received from said set-top box by said notice receiving means.

14. A computer-readable storage medium storing a control program to be executed in an information distributing apparatus for distributing print information via a cable network for a digital broadcasting system to a user who has a set-top box for transferring received print information to a connected printing apparatus, wherein the control program comprises:
a receiving step for receiving distribution information that should be distributed to a user designated by an information distribution server;
a generation step for generating print information based on said received distribution information for each user;
a distribution step for distributing said print information generated for each user to said set-top box of the designated user utilizing said cable network;
a notice receiving step for receiving a notice of a processing result of said print information from said set-top box; and
an update step for updating a distribution history of said distribution information if a print end notice of said print information is received from said set-top box in said notice receiving step.

* * * * *

UNITED STATES PATENT AND TRADEMARK OFFICE
CERTIFICATE OF CORRECTION

PATENT NO. : 7,047,551 B2
APPLICATION NO. : 09/840103
DATED : May 16, 2006
INVENTOR(S) : Katsuhisa Ogawa et al.

It is certified that error appears in the above-identified patent and that said Letters Patent is hereby corrected as shown below:

DRAWINGS:
Sheet 5, Figure 5, "CONTENS" should read -- CONTENTS --;
Sheet 10, Figure 9, "HOBY" should read -- HOBBY --;
Sheet 11, Figure 10, "Basket" should read -- Basketball --;
Sheet 21, Figure 19, "DELIVER" should read -- DELIVERY --; and
Sheet 26, Figure 24, "MARKETTING" should read -- MARKETING --.

COLUMN 1:
Line 14, "print print" should read -- print --.

COLUMN 2:
Line 50, "personell" should read -- personal --; and
Line 55, "an" should read -- a --.

COLUMN 5:
Line 61, "server" should read -- server 5. --.

COLUMN 6:
Line 46, "form" should read -- from --.

COLUMN 8:
Line 24, "added" should read -- added to --.

COLUMN 11:
Line 50, "massage" should read -- message --.

COLUMN 12:
Lines 1 and 13, "are" should read -- is --.

COLUMN 13:
Line 8, "generating a" should read -- generating an --.

COLUMN 14:
Line 65, "describe" should read -- described --.

UNITED STATES PATENT AND TRADEMARK OFFICE
CERTIFICATE OF CORRECTION

PATENT NO. : 7,047,551 B2
APPLICATION NO. : 09/840103
DATED : May 16, 2006
INVENTOR(S) : Katsuhisa Ogawa et al.

It is certified that error appears in the above-identified patent and that said Letters Patent is hereby corrected as shown below:

COLUMN 15:
Line 2, "form" should read -- from --.

COLUMN 17:
Line 5, "form" should read -- from --; and
Line 19, "s1301," should read -- S1301, --.

COLUMN 21:
Line 64, "STB 11" should read -- STB 11. --.

COLUMN 22:
Line 43, "describe" should read -- described --.

COLUMN 23:
Line 10, "user Id" should read -- user ID --; and
Line 55, "is" should read -- are --.

COLUMN 24:
Line 32, "comuptes" should read -- computes --; and
Line 36, "supplied" should read -- supplies --.

COLUMN 26:
Line 35, "costs" should read -- cost --;
Lines 40 and 42, "is" should read -- are --; and
Line 60, "corresponding" should read -- corresponding to --.

COLUMN 27:
Line 13, "have" should read -- has --.

COLUMN 30:
Line 48, "form" should read -- from --.

COLUMN 31:
Lines 42, 47, 50, 56 and 64, insert a paragraph break after "wherein"; and
Line 52, "transfer" should read -- transfers --.

COLUMN 32:
Line 35, "diver" should read -- driver --.

UNITED STATES PATENT AND TRADEMARK OFFICE
CERTIFICATE OF CORRECTION

PATENT NO. : 7,047,551 B2
APPLICATION NO. : 09/840103
DATED : May 16, 2006
INVENTOR(S) : Katsuhisa Ogawa et al.

It is certified that error appears in the above-identified patent and that said Letters Patent is hereby corrected as shown below:

COLUMN 33:
Lines 6 and 14, insert a paragraph break after "wherein".

Signed and Sealed this

Sixteenth Day of January, 2007

JON W. DUDAS
*Director of the United States Patent and Trademark Office*